(12) United States Patent
Watanabe et al.

(10) Patent No.: US 8,433,152 B2
(45) Date of Patent: Apr. 30, 2013

(54) INFORMATION PROCESSING APPARATUS, INFORMATION PROCESSING METHOD, AND PROGRAM

(75) Inventors: Shinji Watanabe, Tokyo (JP); Junichiro Enoki, Tokyo (JP)

(73) Assignee: Sony Corporation, Tokyo (JP)

( * ) Notice: Subject to any disclaimer, the term of this patent is extended or adjusted under 35 U.S.C. 154(b) by 283 days.

(21) Appl. No.: 12/911,290

(22) Filed: Oct. 25, 2010

(65) Prior Publication Data

US 2011/0150353 A1    Jun. 23, 2011

(30) Foreign Application Priority Data

Dec. 18, 2009  (JP) ................................ P2009-288187

(51) Int. Cl.
 *G06K 9/40* (2006.01)
(52) U.S. Cl.
 USPC .......................................................... 382/255
(58) Field of Classification Search .................... None
 See application file for complete search history.

(56) References Cited

U.S. PATENT DOCUMENTS 6,021,221 A * 2/2000 Takaha ........................ 382/199
2005/0243350 A1* 11/2005 Aoyama ...................... 358/1.9

FOREIGN PATENT DOCUMENTS

JP    2002-203245    7/2002

OTHER PUBLICATIONS

Lu Yan et al., "Image Deblurring With Blurred/Nosy Image Pairs", ACM Transactions on Graphics (TOG), Jul. 3, 2007, vol. 26, No. 3.

* cited by examiner

*Primary Examiner* — Stephen R Koziol
*Assistant Examiner* — Amandeep Saini
(74) *Attorney, Agent, or Firm* — Finnegan, Henderson, Farabow, Garrett & Dunner, L.L.P.

(57) ABSTRACT

An information processing apparatus includes a first generating unit, a second generating unit, and an updating unit. The first generating unit generates a point spread function representing the degree of blurring generated in the input image. The second generating unit generates a plurality of corrected block images obtained by correcting blurring of structure components of plural input block images based on the point spread function. The updating unit executes one or more times an updating process to update the corrected block images, followed by making structure components of the updated corrected block images into new corrected block images.

8 Claims, 24 Drawing Sheets

FIG. 5
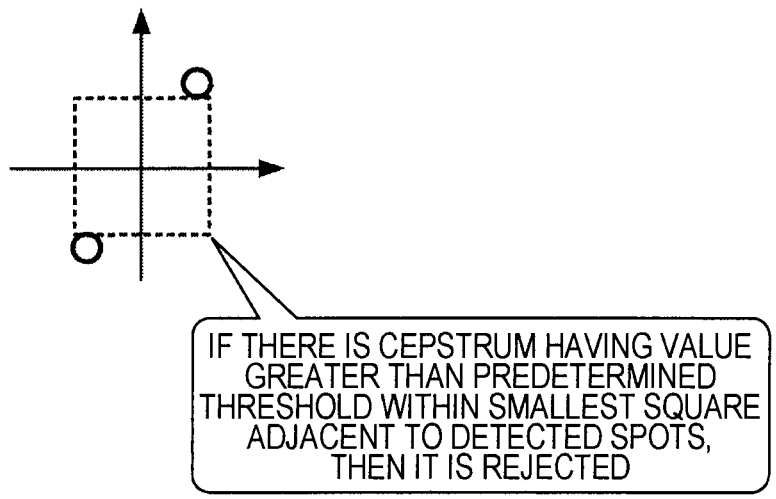
IF THERE IS CEPSTRUM HAVING VALUE GREATER THAN PREDETERMINED THRESHOLD WITHIN SMALLEST SQUARE ADJACENT TO DETECTED SPOTS, THEN IT IS REJECTED
FIG. 6
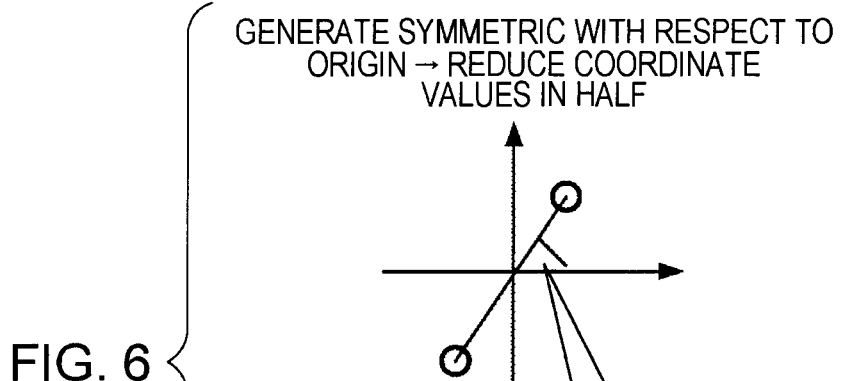
GENERATE SYMMETRIC WITH RESPECT TO ORIGIN → REDUCE COORDINATE VALUES IN HALF
MEASURE DISTANCE FROM EACH COORDINATE POINT TO STRAIGHT LINE
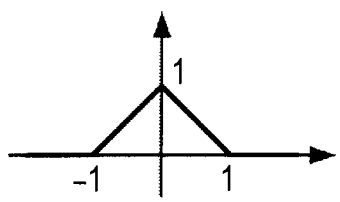

PATTERN 1

PATTERN 2

PATTERN 3

PATTERN 4

INFORMATION PROCESSING APPARATUS, INFORMATION PROCESSING METHOD, AND PROGRAM

BACKGROUND OF THE INVENTION

1. Field of the Invention

The present invention relates to an information processing apparatus, an information processing method, and a program. Specifically, the present invention relates to an information processing apparatus, an information processing method, and a program for collecting hand-shake blurring when shooting, so-called defocusing due to focal length shift, or the like can be corrected.

2. Description of the Related Art

Heretofore, technologies for collecting hand-shake blurring or defocusing (hereinafter, also simply referred to as blurring) occurring in a captured image have been known in the art.

For example, there is the Richardson-Lucy method proposed by L. B. Lucy and William Hardley Richardson. However, the Richardson-Lucy method causes amplification of noise, occurrence of ringing, or the like at the zero point when solving an inverse problem using a spectrum that falls into the zero point on the frequency axis of a point spread function (PSF (Point Spread Function)). Also, when a point spread function is not obtained accurately, amplification of noise, occurrence of ringing, or the like frequently appears at the zero point.

Therefore, according to introduction of a gain map, there has been the residual deconvolution technology by which ringing can be suppressed in the case that a point spread function can be obtained accurately (see, for example, Lu Yuan, Jian Sun, Long Quan, Heung-Yeung Shum, Image deblurring with blurred/noisy image pairs, ACM Transactions on Graphics (TOG), v.26 n.3, July 2007).

SUMMARY OF THE INVENTION

However, with the residual deconvolution technology according to the related art, in the case that a point spread function includes an error, restoration of the structure components (structures) and residuals (residual portions) of an image are not executed well, and accordingly, ringing frequently occurs. Therefore, it is desirable to correct blurring due to hand-shaking or focal length shift by suppressing ringing or the like.

According to a first embodiment of the present invention, an information processing apparatus includes a first generating unit, a second generating unit, and an updating unit. The first generating unit generates a point spread function representing the degree of blurring generated in the input image. The second generating unit generates a plurality of corrected block images obtained by correcting blurring of structure components of plural input block images based on the point spread function. In the second generating unit, the plural input block images are images in plural second blocks obtained by enlarging the peripheries of plural first blocks obtained by dividing the input image. The updating unit executes one or more times an updating process to update the corrected block images using the point spread function to reduce a residual between a blurring-reproduced block image where blurring is generated in the corrected block image and the input block image corresponding to the blurring-reproduced block image, followed by making structure components of the updated corrected block images into new corrected block images.

The second generating unit may define the size of the second block based on the number of taps of Fast Fourier Transform used for generating the point spread function.

The second generating unit may define the size of the second block based on the number of repetitive calculations of a separation filter that separates a structure component and a text component of the corrected block image from each other.

The second generating unit may define the size and position of each of the second blocks so that the coordinate of a predetermined side of the second block in a predetermined direction corresponds to a multiple of a predetermined integer number.

The updating unit may further update the point spread function to reduce a residual between the blurring-reproduced block image and the input block image.

The third generating unit may generate a corrected image where blurring of the input image is corrected by connecting the corrected block images after completing the update process.

According to a second embodiment of the present invention, an information processing method includes the step of allowing an information processing apparatus that corrects blurring generated in an image to perform the following process. That is, the process includes the steps of: generating a point spread function representing the degree of blurring generated in the input image; generating a plurality of corrected block images obtained by correcting blurring of structure components of plural input block images based on the point spread function, where the plural input block images are images in plural second blocks obtained by enlarging the peripheries of plural first blocks obtained by dividing the input image; and executing one or more times an updating process to update the corrected block images using the point spread function to reduce a residual between a blurring-reproduced block image where blurring is generated in the corrected block image and the input block image corresponding to the blurring-reproduced block image, followed by making structure components of the updated corrected block images into new corrected block images.

According to a third embodiment of the present invention, a program allows a computer to execute the following process. That is, the process includes the steps of: generating a point spread function representing the degree of blurring generated in the input image; generating a plurality of corrected block images obtained by correcting blurring of structure components of plural input block images based on the point spread function, where the plural input block images are images in plural second blocks obtained by enlarging the peripheries of plural first blocks obtained by dividing the input image; and executing one or more times an updating process to update the corrected block images using the point spread function to reduce a residual between a blurring-reproduced block image where blurring is generated in the corrected block image and the input block image corresponding to the blurring-reproduced block image, followed by making structure components of the updated corrected block images into new corrected block images.

According to one embodiment of the present invention, the blurring of an image due to hand-shaking or focal length shift can be corrected. In particular, according to the one embodiment of the present invention, the image blurring can be corrected while avoiding a decrease in image quality.

BRIEF DESCRIPTION OF THE DRAWINGS

FIG. 5 is a diagram illustrating a determining method for determining whether or not the estimation of a default estimated PSF has succeeded;

FIG. 6 is a diagram illustrating a generating method for generating a default estimated PSF;

DESCRIPTION OF THE PREFERRED EMBODIMENTS

Hereafter, the modes for carrying out the present invention (hereinafter, referred to as embodiments) will be described in detail in the order of:

1. First Embodiment
2. Modified example 1
3. Second embodiment
4. Modified example 2

<1. First Embodiment>

[The Configuration of Information Processing Apparatus]

Figure 1:
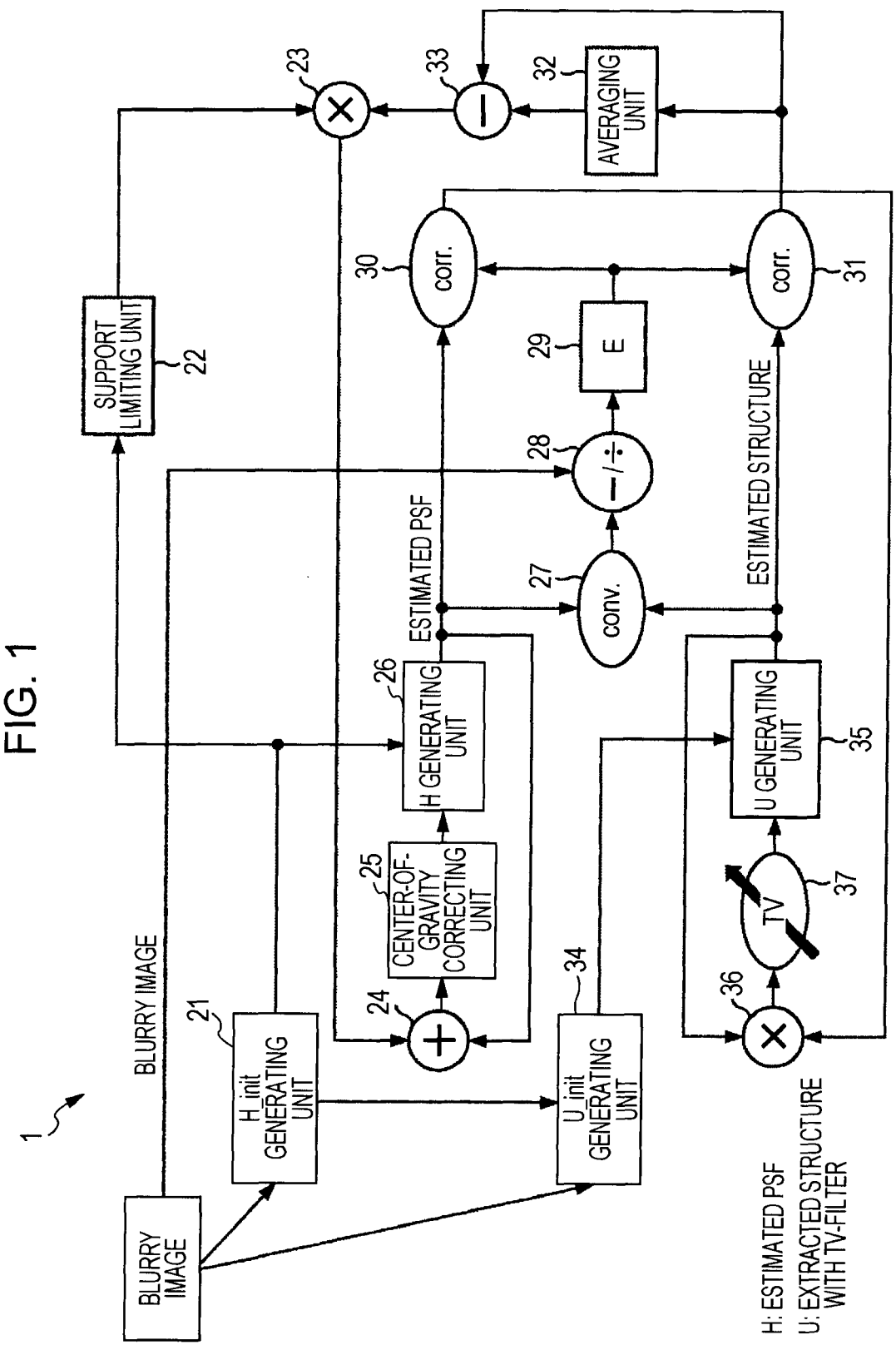
FIG. 1 is a block diagram illustrating a first configuration example of an information processing apparatus to which an embodiment of the present invention has been applied.
Figure 2:
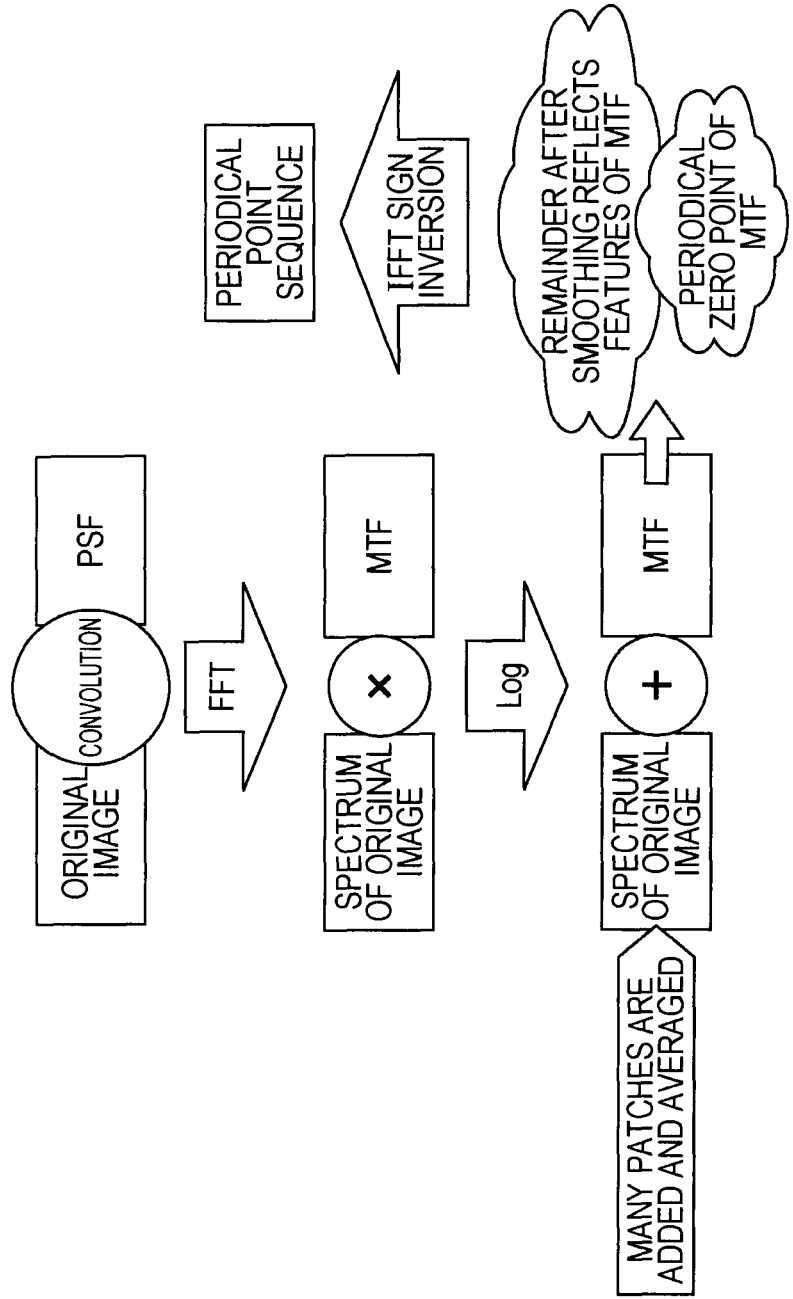
FIG. 2 is a diagram illustrating the overview of the estimating method of a default estimating PSF.

FIG. 1 is a diagram illustrating an exemplary configuration of an information processing apparatus 1 according to a first embodiment of the present invention.

The information processing apparatus 1 receives a blurry image that includes hand-shake blurring occurred when shooting and is an image compressed by JPEG (Joint Photographic Experts Group) compression.

The information processing apparatus 1 divides an input blurry image into multiple blocks g, and for each block executes default estimation regarding a point spread function h that represents (the direction and length of) blurring generated at the block g, and a structure f that represents a great amplitude component such as a flat portion or edge or the like of the block g.

Subsequently, the information processing apparatus 1 repeatedly updates the point spread function h and the structure f subjected to default estimation for each block such that the point spread function h and the structure f approximate to a true point spread function and a true structure respectively.

Here, in the following description, the point spread function h when executing updating by k times will be referred to as a point spread function $h^k$, and the structure f when executing updating by k times will be referred to as a structure $f^k$.

Also, in the case that the point spread function $h^k$ for each block does not have to be distinguished, this will simply be referred to as a point spread function $H^k$. In addition, in the case that the structure $f^k$ for each block does not have to be distinguished, this will simply be referred to as a structure $U^k$.

Furthermore, in the case that blocks g does not have to be distinguished from one another, this will simply be referred to as a blurry image G.

The information processing apparatus 1 includes an H_init generating unit 21, a support limiting unit 22, a multiplying unit 23, an adding unit 24, a center-of-gravity correcting (Center of gravity revision) unit 25, an H generating unit 26, a cony unit 27, a processing unit 28, a residual generating unit 29, a corr unit 30, a corr unit 31, an averaging (average) unit 32, a subtraction unit 33, a U_init generating unit 34, a U generating unit 35, a multiplying unit 36, and a total variation (Total Variation) filter 37.

The blurry image G is input to the H_init generating unit 21. The H_init generating unit 21 detects feature points on a cepstrum from the luminance value (Y component) of a pixel in the input blurry image to execute the linear estimation of a PSF, and supplies the default estimated PSF obtained according to the linear estimation thereof to the support limiting unit 22 and the H generating unit 26 as the default value H_init (=H0) of a point spread function H.

Note that the H_init generating unit 21 may execute the straight line estimation of a PSF by detecting a feature point on a cepstrum from an R component, a G component, a B component, and an R+G+B component obtained by adding the R component, the G component, and the B component in addition to the Y component of a pixel in the input blurry image G.

The support limiting unit 22 generates support limiting information used for updating only the vicinity of the default value H_init (=the default estimated PSF) from the H_init generating unit 21 as a region to be updated, and supplies this to the multiplying unit 23.

Now, the support limiting information will be referred to as mask information with only the vicinity of the default estimated PSF as a region to be updated, and with a region other than the region to be updated as zero fixedly.

The multiplying unit 23 extracts, of the subtraction results $U^k$o $(G-H^kOU^k)$-mean $(H^k)$ from the subtracting unit 33, only the one corresponding to the subtraction result around the default estimated PSF, followed by supplying this result to the adding unit 24.

In other words, for example, the multiplying unit 23 multiplies the support limiting information from the support limiting unit 22, and the corresponding subtraction result $U^k$o $(G-H^kOU^k)$-mean $(H^k)$ from the subtracting unit 33, extracts only the one corresponding to the subtraction result around the PSF, and supplies this to the adding unit 24.

Note that o represents correlation calculation, and 0 represents convolution calculation. Also, mean $(H^k)$ represents the average value of the point spread function $H^k$.

The adding unit 24 multiplies the value $U^k$o $(G-H^kOU^k)$ of the values $U^k$o $(G-H^kOU^k)$-mean$(H^k)$ from the multiplying unit 23 by an undetermined multiplier $\lambda$. Subsequently, the adding unit 24 adds the point spread function $H^k$ from the H generating unit 26 to a value $\lambda U^k$o $(G-H^kOU^k)$-mean $(H^k)$ obtained as a result thereof, applies Lagrange's method for undetermined multipliers to the value $H^k+\lambda U^k$o $(G-H^kOU^k)$-mean $(H^k)$ obtained as a result thereof, thereby calculating a value a as the solution of the undetermined multiplier $\lambda$.

The adding unit 24 substitutes the value a calculated by the Lagrange's method for undetermined multipliers for the value $H^k+\lambda U^k$o $(G-H^kOU^k)$-mean $(H^k)$, and supplies a value $H^k+a U^k$o $(G-H^kOU^k)$-mean $(H^k)$ obtained as a result thereof to the center-of-gravity correcting unit 25. Thus, $H^k+aU^k$o $(G-H^kOU^k)$-mean $(H^k)=H^k+\Delta H^k$ obtained for multiple blocks each is supplied to the center-of-gravity unit 25.

The center-of-gravity unit 25 moves the gravity of the point spread function $H^k+\Delta H^k$ (where $\Delta H^k$ is the updated amount) to the center of the screen (the gravity of the default value H_init of the point spread function) by bilinear interpolation, and supplies the point spread function $H^k+\Delta H^k$ of which the gravity has been moved, to the H generating unit 26. Note that the details thereof will be described later with reference to FIG. 8.

The H generating unit 26 supplies the default value H_init from the H_init generating unit 21 to the adding unit 24, conv unit 27, and corr unit 30 as a point spread function H.sup.0.

Also, the H generating unit 26 supplies the point spread function $H^k+\Delta H^k$ from the center-of-gravity unit 25 to the adding unit 24, cony unit 27 and corr unit 30 as a point spread function $H^{k+1}$ after updating.

In the case that a point spread function $H^{k-1}+\Delta H^{k-1}$ obtained by updating the point spread function $H^{k-1}$ has been supplied from the center-of-gravity unit 25, the H generating unit 26 similarly supplies the point spread function $H^{k-1}+\Delta H^{k-1}$ from the center-of-gravity unit 25 to the adding unit 24, cony unit 27 and corr unit 30 as a point spread function $H^k$ after updating.

The cony unit 27 executes convolution calculation between the point spread function $H^k$ from the H generating unit 26 and the structure $U^k$ from the U generating unit 35, and supplies a calculation result $H^kOU^k$ thereof to the processing unit 28. Note that the calculation result $H^kOU^k$ is an image where blurring is caused on the structure $U^k$ using the point spread function $H^k$.

The processing unit 28 subtracts from the input blurry image G the calculation result $H^kOU^k$ from the cony unit 27, and then supplies a subtraction result $G-H^kOU^k$ thereof to the residual generating unit 29.

The residual generating unit 29 supplies the subtraction result $G-H^kOU^k$ from the processing unit 28 to the corr unit 30 and the corr unit 31 as a residual $E^k$.

The corr unit 30 executes correlation calculation between the residual $E^k$ from the residual generating unit 29 and the structure $H^k$ from the H generating unit 26, and then supplies a calculation result $H^k$o $(G-H^kOU^k)$ thereof to the multiplying unit 36.

The corr unit 31 executes correlation calculation between the residual $E^k$ from the residual generating unit 29 and the structure $U^k$ from the U generating unit 35, and then supplies a calculation result $U^k$o $(G-H^kOU^k)$ thereof to the subtracting unit 33.

The point spread function $H^k$ is supplied from the H generating unit 26 to the averaging unit 32 via the processing unit 28, residual generating unit 29, and corr unit 31.

The averaging unit 32 calculates the average value mean $(H^k)$ of the point spread function $H^k$ from the corr unit 31, and then supplies this to the subtracting unit 33.

The subtracting unit 33 subtracts the mean $(H^k)$ from the averaging unit 32 from the calculation result $U^k$o $(G-H^kOU^k)$ supplied from the corr unit 31, and then supplies a subtraction result $U^k$o $(G-H^kOU^k)$-mean $(H^k)$ obtained as a result thereof to the multiplying unit 23.

The U_init generating unit 34 uses the default value H_init (=default estimated PSF) generated by the H_init generating unit 21 to reduce the input blurry image G (block g) with the default estimated PSF to return the convoluted PSF to one point, thereby generating a reduced image that is an image where the blurring of the blurry image G has been removed (decreased).

Also, the U_init generating unit 34 enlarges the reduced image with the default estimated PSF size to generate an image that is an image blurred by enlargement of which the blurring has been removed, and sets this as the default value U_init of the structure U, and then supplies this to the U generating unit 35.

Figure 7:
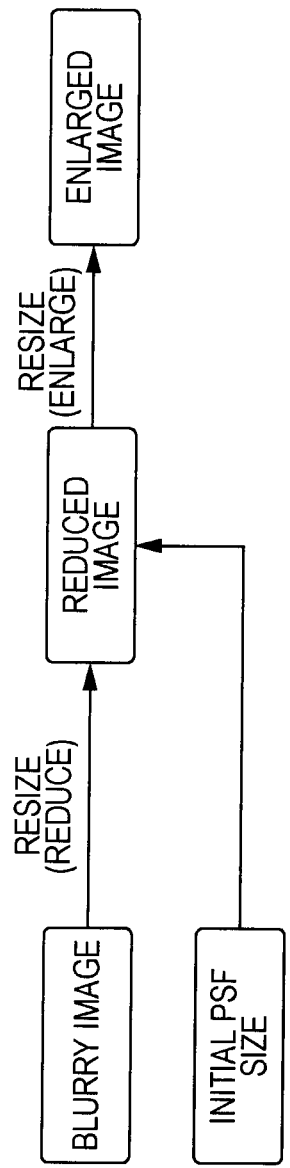
FIG. 7 is a diagram illustrating a generating method of the default value U_init of a structure U.

Note that the details of the method for setting the default value U_init by the U_init generating unit 34 will be described with reference to later-described FIG. 7.

The U generating unit 35 supplies the structure $U^{k+1}$ from the total variation filter 37 to the cony unit 27, corr unit 31, and multiplying unit 36.

Also, the structure $U^k$ is supplied to the U generating unit 35 from the total variation filter 37. The U generating unit 35 supplies the structure $U^k$ from the total variation filter 37 to the cony unit 27, corr unit 31, and multiplying unit 36.

The multiplying unit 36 multiplies the calculation result $H^k$O $(G-H^kOU^k)$ from the corr unit 30 by the structure $U^k$ from the U generating unit 35, and then supplies a multiplication result $U^k$ {$H^k$O $(G-H^kOU^k)$} thereof to the total variation filter 37 as a structure after updating. The total variation filter 37 separates the multiplication result $U^k$ {$H^k$O $(G-H^k$OU$^k)$} from the multiplying unit 36 into a structure component and a texture component, and then supplies the structure component obtained by separation to the U generating unit 35 as the structure $U^{k+1}$ serving as the next target to be updated.

As described above, the cony unit 27 through corr unit 31, U generating unit 35, total variation filter 37, and so on use the default value H_init (=H.sup.0) of the point spread function H generated by the H_init generating unit 21 to execute updating of the structure $U^0$ by the Richardson-Lucy method.

Also, in the case that the point spread function $H^{k-1}$ has been updated, the cony unit 27 through corr unit 31, U generating unit 35, total variation filter 37, and so on use the newest point spread function $H^k$ obtained by updating to execute updating of the structure $U^k$ by the Richardson-Lucy method.

With the Richardson-Lucy method, amplified noise and generated ringing are eliminated by separation between a structure component and a texture component by the total variation filter 37 regarding the structure $U^{k+1}$ obtained by updating of the structure $U^k$, by which the noise and ringing can be suppressed greatly.

Here, the structure component represents a component that constitutes the skeleton of an image, such as a flat portion where almost no change occurs in the image, a inclined portion where a gradual change occurs in the image, the profile of a subject, an edge, or the like. Also, it represents a component that constitutes the details of the image, such as a fine pattern of the subject. Therefore, most of the structure components are low frequency components with low space frequencies and most of the texture components are high frequency components with high space frequencies.

Further, the total variation filter 37 is described in detail in "Structure-Texture Image Decomposition Modeling, Algorithms, and Parameter Selection (Jean-Francois Aujol)".

Note that a filter threshold that indicates the boundary between the structure component and the texture component is set to the total variation filter 37 as one of the parameters, and the parameter thereof is adjusted, by which more many details can be included in the structure component (structure) to be output.

However, with the initial stage of a repetitive updating process (described later in FIG. 10) in which the structure $U^k$, and a later-described point spread function $H^k$ are updated alternately repeatedly, the point spread function $H^k$ has not been updated sufficiently, and accordingly, the point spread function $H^k$ may include many errors in some cases.

Therefore, upon using the point spread function $H^k$ including many errors to execute updating of the structure $U^k$, ringing or the like corresponding to the errors included in the point spread function $H^k$ occurs as to a structure $U^{k+1}$ to be obtained by updating.

Similarly, with regard to the structure $U^k$ as well, ringing or the like corresponding to the errors included in the point spread function $H^k$ occurs.

This also causes an adverse effect on the point spread function $H^k$ to be updated using the structure $U^k$ where ringing or the like has occurred.

Therefore, while the point spread function $H^k$ has not been sufficiently updated, the filter threshold to be set to the total variation filter 37 is set high, thereby eliminating ringing and noise strongly, and preventing the structure U to be updated from deteriorating due to occurrence of ringing or the like.

Upon the point spread function $H^k$ being updated to some extent, and approximating to a truer point spread function, the filter threshold to be set to the total variation filter 37 is set low, and accordingly, restoration of details is executed by the true point spread function $H^k$.

In other words, while the point spread function $H^k$ has not been sufficiently updated, the filter threshold is set high such that, of pixels making up the structure $U^k$ output from the total variation filter 37, total variation that represents the luminance difference absolute value sum between adjacent pixels becomes small.

Also, upon the point spread function $H^k$ being updated to some extent, and approximating to a truer point spread function, the filter threshold is set low such that the total variation of the structure $U^k$ output from the total variation filter 37 does not become smaller any more.

Thus, with the total variation filter 37, the structure $U^k$ is smoothed while remaining an edge include in the structure $U^k$, by which ringing and noise included in the structure U can be eliminated.

Furthermore, in the first embodiment, the total variation filter 37 is designed to eliminate amplified noise and generated ringing regarding the structure $U^k$ by separation between a structure component and a texture component by the total variation filter 37 in a state in which the filter threshold is set low sufficiently regardless of the degree of updating of the point spread function $H^k$.

The H generating unit 26 through residual generating unit 29, corr unit 31, U generating unit 35, and so on use the default value U_init of the structure $U^k$ to execute updating of the point spread function $H^k$ by the landweber method.

Also, in the case that the structure $U^{k-1}$ has been updated, the H generating unit 26 through residual generating unit 29, corr unit 31, U generating unit 35, and so on use the newest structure $U^k$ obtained by updating to execute updating of the point spread function $H^k$ by the landweber method.

Description will be made below regarding a process in which a structure $f^k$ (the newest structure obtained by updating) of a predetermined block g of multiple blocks making up a blurry image is used as the structure $U^k$, and the point spread function $h^k$ of the predetermined block g is updated as updating of the point spread function $H^k$ by the landweber method.

Now, if we say that the structure $f^k$ at present is f, and the point spread function $h^k$ at present is h, a cost function is provided by the following equation (1):

$$e^2 = \|g - h^*f\|^2 \quad (1)$$

Note that, in equation (1), $\| \|$ represents a norm, and * represents multiplication.

In the case that the structure f at present is fixed, in order to minimize e.sup.2 of equation (1), as shown in the following equation (2), equation (1) is differentiated partially with variable h (point spread function h), thereby obtaining a descent direction.

$$\nabla e^2 = \frac{\partial e^2}{\partial h}(-2)fo(g - h \otimes f) \quad (2)$$

Upon searching the point spread function h at present along the descent direction obtained by equation (2), there is the minimum value of equation (2). Upon advancing the point spread function h at present by step size λ in the descent direction obtained by equation (2) as shown in the following equation (3), the updated point spread function h can be obtained.

$$h^{k+1} = h^k + \lambda f^k o(g - h^k \otimes f^k) \quad (3)$$

Note that, in equation (2) and equation (3), the circle represents a correlation operator, and a symbol made up of an x-mark in a circle represents a convolution calculation.

Also, in equation (3), the point spread function $h^k+1$ represents the point spread function after updating, and the point spread function $h^k$ represents the point spread function h (point spread function before updating) at present. Further, the structure $f^k$ represents the structure f at present.

However, the structure $h^k+1$ is enforced to satisfy $\Sigma^i_{i=1} h(i) = 1$ with the point spread function $h^{k+1}$ (i) of each of the multiple blocks making up a blurry image, and accordingly, the point spread function $h^{k+1}$ is normalized by a loop formed by the H generating unit 26 through residual generating unit 29, corr unit 31, U generating unit 35, and so on. Therefore, when the updated amount $\Delta h^k$ of the point spread function $h^k$ becomes the same sign as the point spread function $h^k$, as a result of the normalization, the point spread function $h^{k+1}$ returns to the value before updating unintentionally.

$$\sum_i h(i) = 1$$

Upon adding the constraint of $\Sigma^i_{i=1} h(i)=1$ to equation (3) to apply Lagrange's method for undetermined multipliers, the following equation (4) is derived.

$$h^{k+1} = h^k + \lambda f^k o(g - h^k \otimes f^k) - \text{mean}(h) \quad (4)$$

Note that, in equation (4), mean (h) denotes the average value of $h^k$. The mean (h) is subtracted by the subtracting unit 33.

Also, according to a rounding error, the center of gravity sometimes deviates from the center of the screen while updating the point spread function $h^k$, and accordingly, inaccurate residual e is obtained, and this causes an adverse effect on updating (restoration) of the structure $f^k$.

Therefore, the center-of-gravity correcting unit 25 executes parallel movement by bilinear interpolation at or below one pixel (pix) such that the point spread function $h^k + \Delta h^k (= h^{k+1})$ and the center of gravity come to the center of the screen.

The information processing apparatus 1 calculates, as described above, the structure $U^k$ after updating as a structure that represents a block from which blurring has been removed, making up a blurry image. Subsequently, the information processing apparatus 1 obtains an original image from which blurring has been removed by making up each of the calculated structures $U^k$ so as to become one image.

[Estimation Method for Obtaining Default Estimated PSF]

Next, description will be made regarding the overview of the estimating method for the default estimated PSF that the H_init generating unit 21 executes.

A blurry image can be modeled by convolution between a blurring-free original image (the original image corresponding to the blurry image) and a PSF.

The spectrum of a straight line PSF has features in which the length of blurring falls into the zero point periodically, and according to the convolution between the original image and a PSF, with the spectrum of a blurry image as well, the length of blurring falls into the zero point periodically.

The interval and direction where the length of blurring falls into the zero point are obtained, by which the length and direction of the straight line blurring of a PSF can be approximated. Therefore, the blurry image is subjected to FFT (Fast Fourier Transform) to calculate the spectrum of the blurry image, and the logarithm of the calculated spectrum is obtained, thereby transforming into the sum between the spectrum of the original image and the spectrum of the PSF (MTF).

The information which has to be used here is the MTF alone, and accordingly, many patches are added and averaged regarding the spectrum of the blurry image, by which the features of the spectrum of the original image are lost, and only the features of the MTF can be represented.

Next, a specific estimating method used for estimating a default estimated PSF will be described with reference to FIG. 3 through FIG. 6.

Figure 3:
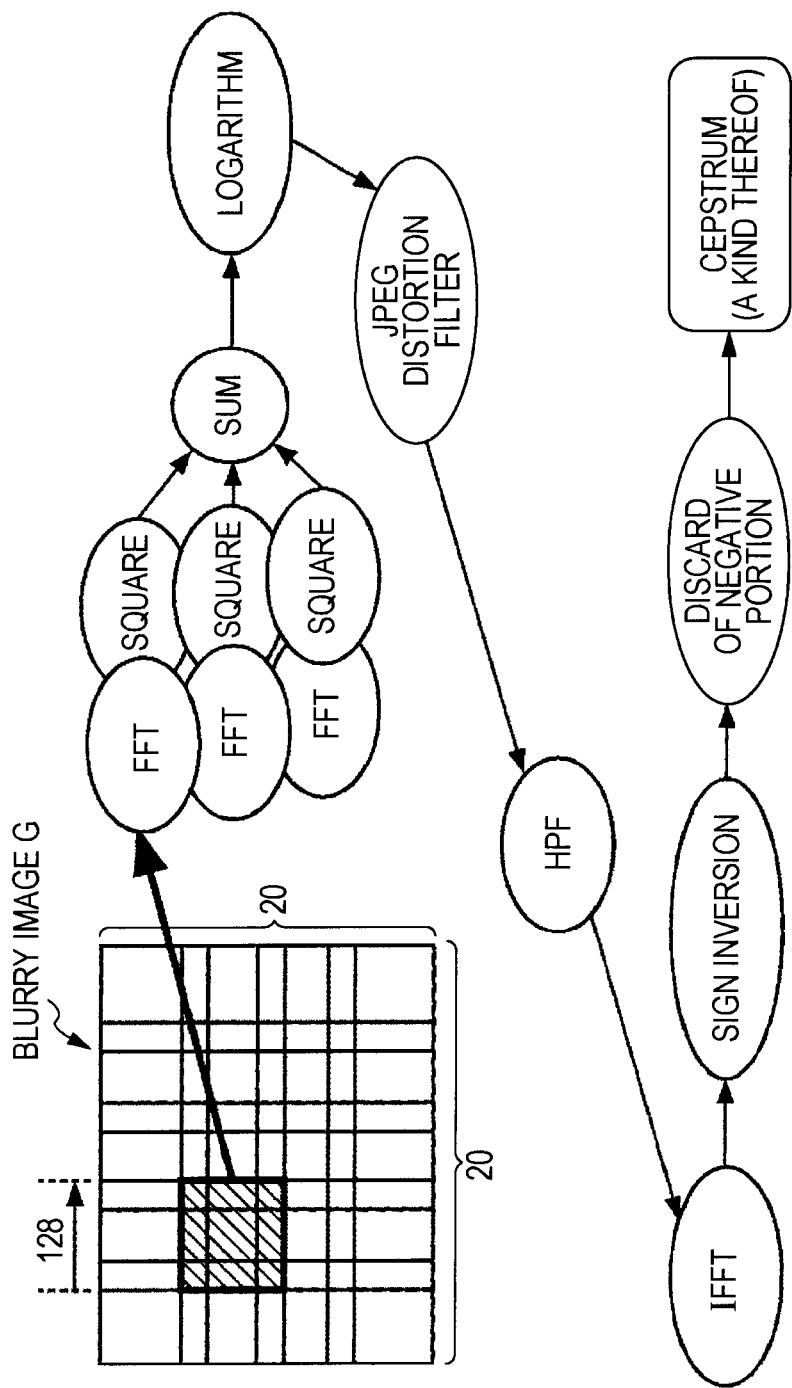
FIG. 3 is a diagram illustrating a generating method for generating a cepstrum regarding a blurry image.

FIG. 3 illustrates a generating method used for generating a cepstrum regarding a blurry image.

The H_init generating unit 21 divides a blurry image to be input into multiple blocks, executes FFT (Fast Fourier Transform) for each divided block to calculate the spectrum corresponding to each block.

In other words, for example, the H_init generating unit 21 subjects one of a Y component, a R component, a G component, and a B component, which are pixels making up a block obtained by dividing a blurry image, and a R+G+B component to FFT to calculate the corresponding spectrum.

Also, the H_init generating unit 21 obtains a logarithm regarding the sum of squares of the spectrum corresponding to each block, and removes distortion by a JPEG removal filter used for removing distortion generated at the time of JPEG compression. This prevents distortion generated at the time of JPEG compression from influencing spectrum precision.

Further, the H_init generating unit 21 executes a filtering process by an HPF (high pass filter) as to the logarithm log $\Sigma |gs|^2$ of the sum of squares of the spectrum gs corresponding to each block g after distortion removal by the JPEG removal filter to emphasize periodical falling due to blurring, thereby decreasing smooth change due to blurring.

The H_init generating unit 21 subjects a residual component subtracted with moving average, i.e., the logarithm log $\Sigma |gs|^2$ of the sum of squares of the spectrum after the filtering process by the HPF to IFFT (Inverse Fast Fourier Transform) to generate a kind of cepstrum.

More specifically, the H_init generating unit 21 inverts a positive/negative sign with the logarithm log $\Sigma |gs|^2$ of the sum of squares of the spectrum after the filtering process by the HPF.

Subsequently, the H_init generating unit 21 discards a portion including a negative sign of the log $\Sigma |gs|^2$ of which the positive/negative sign has been inverted, and generates a kind of cepstrum based on only a portion including a positive sign.

Subsequently, the H_init generating unit 21 calculates the maximum value of luminescent spots regarding the generated cepstrum.

In other words, the H_init generating unit 21 calculates a cepstrum including the maximum value of the generated cepstrums as the maximum value of the luminescent spots.

Figure 4A:
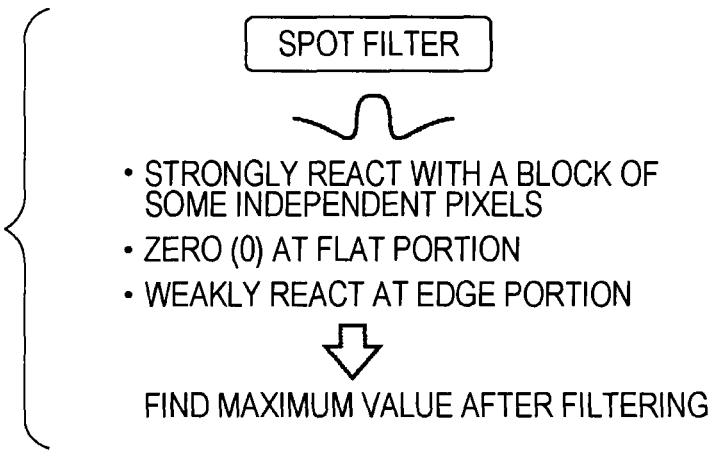
FIGS. 4A through 4C are diagrams describing a calculating method for calculating the maximum value of luminescent spots as to a cepstrum.
Figure 4B:
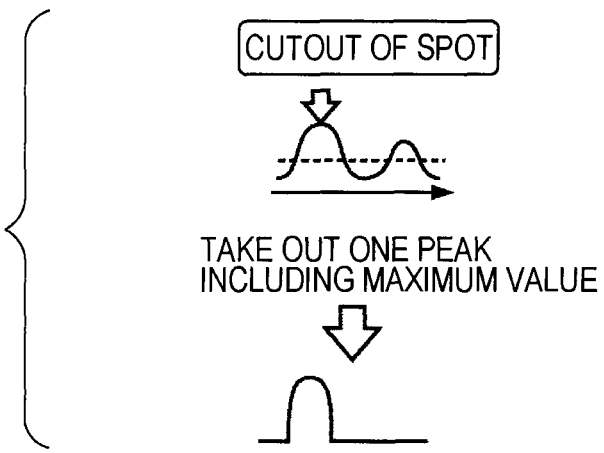
Figure 4C:
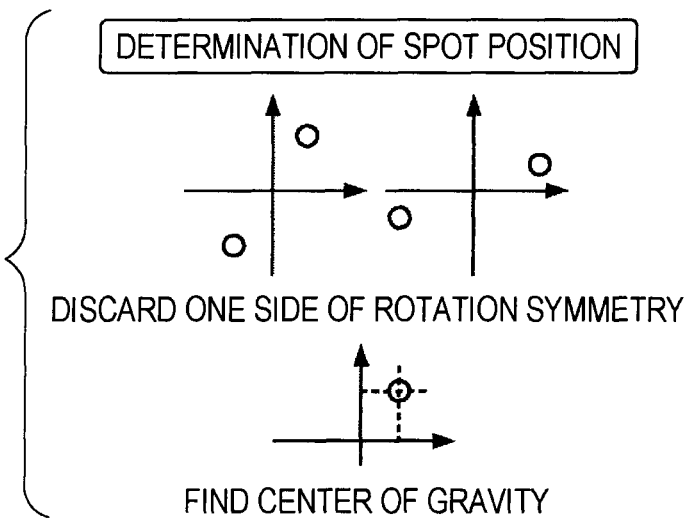

Next, FIGS. 4A through 4C illustrate a calculation method used for calculating the maximum value of luminescent spots regarding the generated cepstrum.

The H_init generating unit 21 executes, as shown in FIG. 4A, subjects the generated cepstrum to a filtering process by a spot filter which compares adjacent pixels and strongly reacts with a block of multiple pixels having great luminance.

Also, as shown in FIG. 4B, the H_init generating unit 21 takes out one peak including the maximum value from the cepstrum following the filtering process by the spot filter shown in FIG. 4A.

Further, the H_init generating unit 21 determines a spot position, as shown in FIG. 4C. Note that the spot position represents the center-of-gravity position of a spot made up of multiple cepstrums making one peak including the maximum value.

Next, FIG. 5 describes a determining method used for determining whether or not estimation of a default estimated PSF has succeeded. Note that the estimating method for the default estimated PSF will be described with reference to later-described FIG. 6.

Luminescent spots are in origin symmetry, and accordingly, there is another feature point at an origin symmetry position. In other words, as feature points there are two spots that are symmetric as to the origin.

In the case that there is a portion that exceeds a threshold within the minimum square range adjacent to these two spots, i.e., in the case that there is a cepstrum having a value that exceeds a threshold within the minimum square range, the H_init generating unit 21 determines that the default estimation of the default estimated PSF has failed.

In this case, the H_init generating unit 21 approximates the default estimated PSF subjected to default estimation to a PSF in which the distribution of blurring follows a Gaussian distribution (normal distribution), and sets the PSF obtained as a result thereof as the default H_init.

Also, in the case that there is no portion that exceeds a threshold within the minimum square range adjacent to the two spots, i.e., in the case that there is no cepstrum having a value that exceeds a threshold within the minimum square range, the H_init generating unit 21 determines that the default estimation of the default estimated PSF has succeeded, and sets the default estimated PSF as the default value H_init.

Next, FIG. 6 illustrates an estimating method used for estimating (generating) the default estimated PSF based on the two spots.

In the case that there is no portion that exceeds a threshold within the minimum square range adjacent to the two spots, the H_init generating unit 21 generates, as shown in FIG. 6, a straight line that connects the spot positions with origin symmetry as a default estimated PSF, and sets this as the default value H_init.

[Generating Method Used for Generating the Default Value U_Init of the Structure $U^k$]

Next, description will be made regarding a generating method used for generating the default value U_init of the structure $U^k$ that the U_init generating unit 34 executes, with reference to FIG. 7.

The U_init generating unit 34 reduces a blurry image to be input with the size of the default estimated PSF to generate a reduced image, and enlarges the generated reduced image with the size of the default estimated PSF to generate an enlarged image. Subsequently, the U_init generating unit 34 separates the generated enlarged image into a structure component and a texture component, and then supplies the structure component obtained by separation to the U generating unit 35 as the default value U_init of the structure U.

In other words, for example, the U_init generating unit 34 reduces a block making up an input blurry image with the same reduction size as a reduction size in which the default estimated PSF of the block is reduced to one point, supplied from the H_init generating unit 21, thereby generating a reduced block in which blurring generated in the block has been removed (decreased).

Subsequently, the U_init generating unit 34 enlarges the generated reduced block with the same enlargement size as an enlargement size in which the default estimated PSF reduced to one point is enlarged to the original default estimated PSF, thereby generating an enlargement block in which defocusing due to enlargement has occurred, but blurring has not occurred.

The U_init generating unit 34 supplies the generated enlargement block to the U generating unit 35 as the default value U_init (structure $U^0$).

[Correcting Method Used for Correcting Center of Gravity]

Figure 8:
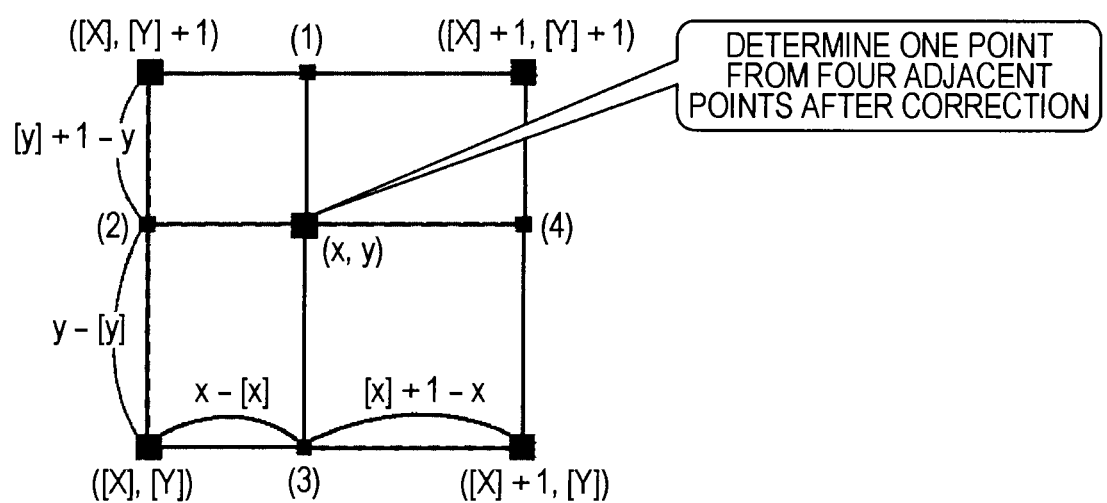
FIG. 8 is a diagram illustrating an interpolation method by bilinear interpolation.

Referring now to FIG. 8, description will be made regarding a correcting method used for correcting the center of gravity that the center-of-gravity correcting unit 25 executes.

FIG. 8 illustrates an interpolation method by bilinear interpolation.

As described above, there is a possibility that while the H generating unit 26 through residual generating unit 29, corr unit 31, U generating unit 35, and so on are updating the structure $H^k$, the center of gravity deviates from the center of the screen due to rounding errors, and accordingly, as shown in FIG. 8, the center-of-gravity correcting unit 25 executes parallel movement by bilinear interpolation such that the center of gravity of the point spread function $H^k + \Delta H^k$ comes to the center of the screen.

[Support Restriction Processing]

Next, with reference to FIGS. 9A and 9B, description will be made regarding a support limiting process that the support limiting unit 22 executes.

Figure 9A:
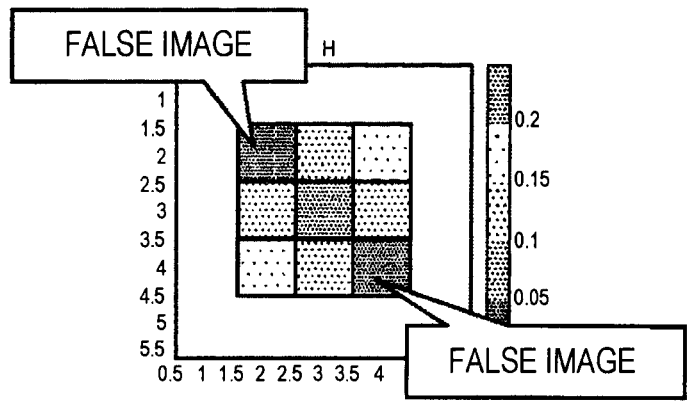
FIGS. 9A and 9B are diagrams describing a support limiting process executed by a support limiting unit.
Figure 9B:
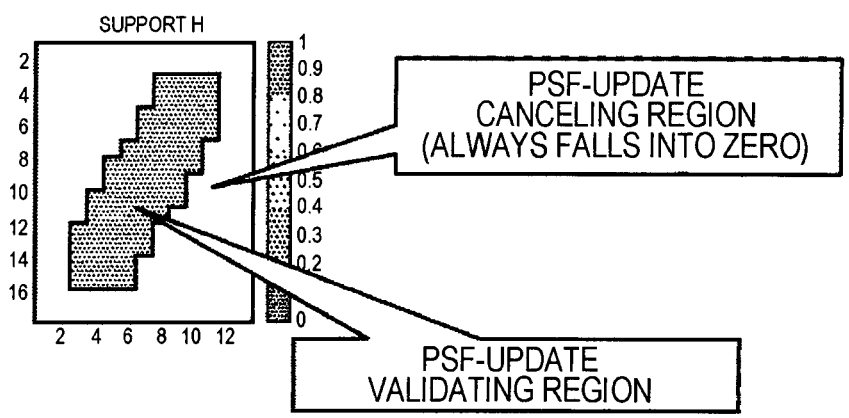

When the H generating unit 26 through residual generating unit 29, corr unit 31, U generating unit 35, and so on update the point spread function $H^k$, the flexibility of the updated amount of $\Delta H$ is high, and as shown in FIG. 9A, false pixels in which blurring that the point spread function $H^k + \Delta H^k$ after updating represents has not been reflected accurately appear at a portion apart from the true PSF (point spread function). Therefore, as shown in FIG. 9B, the support limiting unit 22 allows only the vicinity of the default estimated PSF to be updated, and masks a region other than the vicinity of the default estimated PSF even if there is a pixel at the updated amount $\Delta H^k$, thereby applying support limiting so as to update only the vicinity of the default estimated PSF.

Incidentally, with the updating loop of the point spread function $H^k$, the updated amount $\Delta U^k$ of the structure $U^k$ is gradually reduced, and upon being reduced to some extent, residual $E^k = G - H^k * (U^k + \Delta U^k)$ is saturated (the residual E has hardly changed), and updating of the point spread function $H^k$ is stopped. Therefore, the filter threshold set to the total variation filter 37 is adjusted, thereby lowering (reducing) the residual $E^k$ purposely, which becomes a trigger to resume updating of the point spread function $H^k$.

Also, with the total variation filter 37, in the case that the final output has been done, the filter threshold is reduced (decreased in order), by which the lack of details due to structure output can be overcome.

As the information of the structure $U^k$ used at the time of updating the point spread function $H^k$, in addition to the luminance Y (Y component that represents the sum of a the multiplication results obtained by weighting as to each of a R component, a G component, and a B component), it is also possible to use the sum of R, G, and B3 channels (the sum of a R component, a G component, and a B component). The difference as to the case of updating only with the luminance Y is in that great feedback similar to the channel G can be obtained even as to a blurry image including an edge where blurring is reflected on the channels R and B alone.

Also, as the information of the structure $U^k$ used at the time of updating the point spread function $H^k$, a R component, a G component, and a B component can be used.

[Repetitive Update Process]

Referring now to the flowchart in FIG. 10a, a repetitive updating process that the information processing apparatus 1 executes will be described.

Note that, with the repetitive updating process, an algorithm is employed in which the point spread function $H^k$ and the structure $U^k$ are updated alternately based on the mutual default values without updating the point spread function $H^k$ and the structure $U^k$ separately.

In step S31 and step S32, default estimation regarding the default value H_init and the default value U_init, and initializing of each parameter, a global variable, and so on are executed.

Specifically, for example, in step S31, the H_init generating unit 21 detects feature points on a cepstrum from an input blurry image G, executes straight line estimation of a PSF, sets the default estimated PSF obtained from the straight line estimation thereof as the default value H_init of the point spread function H, and then supplies this to the support limiting unit 22 and the H generating unit 26.

In step S32, the U_init generating unit 34 uses the default value H_init (=default estimated PSF) set by the H_init generating unit 21 to reduce the input blurry image with the size of the default estimated PSF, and return the convoluted PSF to one point, thereby generating a reduced original image that is an image in which the blurring of the blurry image has been removed.

Also, the U_init generating unit 34 enlarges the reduced original image with the size of the default estimated PSF to generate an image that has been an image blurred due to interpolation, and has been corrected regarding the blurring thereof, sets this as the default value U_init of the structure $U^k$, and supplies this to the U generating unit 35.

Specifically, for example, the U_init generating unit 34 reduces a block making up an input blurry image with the same reduction size as a reduction size in which the default estimated PSF of the block is reduced to one point, supplied from the H_init generating unit 21, thereby generating a reduced block in which blurring generated in the block has been removed (decreased).

Subsequently, the U_init generating unit 34 enlarges the generated reduced block with the same enlargement size as an enlargement size in which the default estimated PSF reduced to one point is enlarged to the original default estimated PSF, thereby generating an enlargement block in which defocusing due to enlargement has occurred, but blurring has not occurred.

The U_init generating unit 34 supplies the generated enlargement block to the U generating unit 35 as the default value U_init (structure $U^0$).

In a situation in which both of the structure $U^k$ and the point spread function $H^k$ have not been recognized accurately, in step S33, the structure $U^k$ is updated with the information of the newest point spread function $H^k$, and in step S34, the point spread function $H^k$ is updated with the information of the newest structure $U^k$.

According to this repetition, as the structure $U^k$ and the point spread function $H^k$ are updated alternately, the structure $U^k$ converges on a truer structure U, and the point spread function $H^k$ converges on a truer point spread function H, gradually.

Specifically, in step S33, the conv unit 27 through corr unit 31, U generating unit 35, total variation filter 37, and so on use the default value H_init (=default estimated PSF) of the point spread function $H^k$ to execute updating of the structure $U^0$ by the Richardson-Lucy method according to the related art.

In step S33, the cony unit 27 executes convolution calculation between the point spread function $H^0$ that is the default value H_init of the point spread function $H^k$ from the H generating unit 26, and the structure $U^0$ from the U generating unit 35, and then supplies a calculation result $H^0U^0$ thereof to the processing unit 28.

The processing unit 28 subtracts from the input blurry image G the calculation result $H^0U^0$ from the cony unit 27, and then supplies a subtraction result $G-H^0OU^0$ thereof to the residual generating unit 29.

The residual generating unit 29 supplies the subtraction result $G-H^0OU^0$ from the processing unit 28 to the corr unit 30 and the corr unit 31.

The corr unit 30 executes correlation calculation between the subtraction result $G-H^0OU^0$ from the residual generating unit 29 and the point spread function $H^0$ from the H generating unit 26, and then supplies a calculation result $H^0o$ $(G-H^0OU^0)$ thereof to the multiplying unit 36.

The multiplying unit 36 multiplies the calculation result $H^0o$ $(G-H^0OU^0)$ from the corr unit 30 by the structure $U^0$ from the U generating unit 35, and then supplies the multiplication result $U^0$ $\{H^0o$ $(G-)H^0OU^0)\}$ to the total variation filter 37 as the structure after updating.

The total variation filter 37 executes a process used for suppressing amplified noise and generated ringing, as the multiplication result $U^0$ $\{H^0o$ $(G-)H^0OU^0)\}$ from the multiplying unit 36.

Subsequently, the total variation filter 37 supplies, of the structure component and the texture component of the multiplication result $U^0$ $\{H^0o$ $(G-)H^0OU^0)\}$ obtained by the process thereof, the structure component to the U generating unit 35.

The U generating unit 35 obtains the structure component supplied from the total variation filter 37 as a structure $U^1$ that is a target to be updated of the next structure.

Subsequently, in order to further update the obtained structure $U^1$, the U generating unit 35 supplies the structure $U^1$ to the cony unit 27, corr unit 31, and multiplying unit 36.

In step S34, the H generating unit 26 through residual generating unit 29, corr unit 31, U generating unit 35, and so on use the default value U_init of the structure $U^k$ to execute updating of the point spread function $H^0$ by the landweber method.

Note that, in the above-mentioned step S33, the residual generating unit 29 supplies the subtraction result $G-H^0OU^0$ from the processing unit 28 to the corr unit 30 and corr unit 31.

In step S34, the corr unit 31 executes correlation calculation between the subtraction result $G-H^0OU^0$ from the residual generating unit 29 and the structure $U^0$ from the U generating unit 35, and then supplies a calculation result $U^0o$ $(G-H^0OU^0)$ thereof to the subtracting unit 33.

Also, the corr unit 31 supplies the point spread function $H^0$ from the H generating unit 26 via the cony unit 27, processing unit 28, and residual generating unit 29 to the averaging unit 32.

The averaging unit 32 calculates the average value mean $(H^0)$ of the point spread function $H^0$ from the corr unit 31, and then supplies this to the subtracting unit 33.

The subtracting unit 33 subtracts the mean $(H^0)$ from the averaging unit 32 from the calculation result $U^0o$ $(G-H^0U^0)$ supplied from the corr unit 31, and then supplies a subtraction result $U^0o$ $(G-H^0OU^0-mean)(H^0)$ obtained as a result thereof to the multiplying unit 23.

The multiplying unit 23 extracts, of the subtraction result $U^0o(G-H^0OU^0-mean)(H^0)$ from the subtracting unit 33, only the result corresponding to the subtraction result around the default estimated PSF based on the support limiting information from the support limiting unit 22, and then supplies this to the adding unit 24.

The adding unit 24 multiplies the value $U^ko$ $(G-H^kOU^k)$ of the values $U^ko(G-H^kOU^k)-mean$ $(H^k)$ from the multiplying unit 23 by an undetermined multiplier λ. The adding unit 24 multiplies the value $U^ko$ $(G-H^kOU^k)$ of the values $U^ko(G-H^kOU^k)-mean$ $(H^k)$ from the multiplying unit 23 by an undetermined multiplier λ. Subsequently, the adding unit 24 adds the point spread function $H^k$ from the H generating unit 26 to a value $\lambda U^ko$ $(G-H^kOU^k)-mean$ $(H^k)$ obtained as a result thereof, applies Lagrange's method for undetermined multipliers to the value $H^k+\lambda U^ko$ $(G-H^kOU^k)-mean$ $(H^k)$ obtained as a result thereof, thereby calculating a value a as the solution of the undetermined multiplier $\lambda$.

The adding unit 24 substitutes the value a calculated by the Lagrange's method for undetermined multipliers for the value $H^k+\lambda U^k$o $(G-H^kOU^k)$–mean $(H^k)$, and then supplies a value $H^k+a U^k$o $(G-H^kOU^k)$–mean $(H^k)$ obtained as a result thereof to the center-of-gravity correcting unit 25.

Thus, $H^0$ $aU^0$o$(G-H^0OU^0)$–mean $(H^0)=H^0+\Delta H^0$ obtained for multiple blocks each making up the blurry image is supplied to the center-of-gravity unit 25.

The center-of-gravity unit 25 moves the gravity of the point spread function $H^0+\Delta H^0$ to the center of the screen (the gravity of the default value H_init of the point spread function) by bilinear interpolation, and then supplies the point spread function $H^0+\Delta H^0$ of which the gravity has been moved, to the H generating unit 26.

The H generating unit 26 obtains the point spread function $H^0+\Delta H^0$ from the center-of-gravity unit 25 as the updated default spread function $H^1$.

Subsequently, in order to further update the obtained point spread function $H^1$, the H generating unit 26 supplies the point spread function $H^1$ to the adding unit 24, conv unit 27, and corr unit 30.

In step S35, determination is made whether to end the repetitive updating process. Specifically, for example, determination is made whether or not (at least either the structure $H^k$ or) the updated structure $U^k$ has converged.

In the case that determination is made that the updated structure $U^k$ has not converged, the process returns to step S33.

Note that regarding whether or not the updated structure $U^k$ has converged is determined, for example, by the residual generating unit 29 based on whether or not the sum of squares $\Sigma |E^k|^2$ of the value $G-H^kOU^k$ ($=E^k$) corresponding to each of the blocks making up the blurry image is less than a predetermined value.

Alternatively, the total variation filter 37 may determine based on whether or not of the pixels making up the structure $U^k$ from the multiplying unit 36, total variation that represents the luminance difference absolute value sum between adjacent pixels is changed from increase to decrease.

In step S33, the updated point spread function $H^k$ (e.g., $H^1$) in the previous process in step S34 is used to execute updating of the updated structure $U^k$ (e.g., $U^1$) in the previous process in step S33 by the traditional Richardson-Lucy method.

Specifically, in step S33, the cony unit 27 through corr unit 31, U generating unit 35, total variation filter 37, and so on use the updated point spread function $H^k$ (e.g., $H^1$) in the previous process in step S34 to execute updating of the structure $U^k$ (e.g., $U^1$) by the traditional Richardson-Lucy method.

Following end of the process in step S33, in step S34, the updated structure $U^k$ (e.g., $U^1$) in the previous process in step S33 is used to execute updating of the updated point spread function $H^k$ (e.g., $H^1$) in the previous process in step S34 by the landweber method.

In other words, in step S34, the H generating unit 26 through residual generating unit 29, corr unit 31, U generating unit 35, and so on use the updated structure $U^k$ (e.g., $U^1$) in the previous process in step S33 to execute updating of the updated point spread function $H^k$ (e.g., $H^1$) by the landweber method.

The process proceeds from step S34 to step S35, and thereafter, the same process will be repeated.

Note that in the case that determination is made in step S35 that the updated structure $U^k$ has converged, the repetitive updating process is ended.

As described above, with the repetitive updating process, an arrangement has been made where updating of the structure $U^k$ and the point spread function $H^k$ is executed repeatedly, by which the structure $U^k$ converges to the true structure U (and the point spread function $H^k$ converges to the true point spread function H), and accordingly, ringing and noise generated at the structure $U^k$ obtained finally can be suppressed.

Also, even from a state in which the PSF (=point spread function $H^0$) obtained as the default H_init is inaccurate, an accurate PSF, i.e., a true PSF, or a PSF approximated to a true PSF can be obtained.

Further, according to the support limiting of a PSF, the default value H_init (=default estimated PSF) is updated in the default estimated direction, by which a true PSF or a PSF close to a true PSF can be obtained without divergence.

<2. Modified Example 1>
[Modified Example of Repetitive Updating Process]

Note that, with the repetitive updating process, for example, an arrangement may be made in which, in the case that estimation (generation) of the default value H_init (=point spread function $H^0$) has succeeded in step S31, in step S33 updating of the structure $U^0$ is executed with the default value H_init, and in the case that estimation (generation) of the default value H_init has failed in step S31, in step S33 the PSF is approximated by Gaussian (Gaussian distribution), the approximated PSF is set as the default value H_init, thereby executing updating of the structure $U^0$. In this case, deterioration of the structure $U^0$ due to the shift of the default value H_init (=default estimated PSF) can be prevented.

Also, in step S33, the cony unit 27 through corr unit 31, U generating unit 35, total variation filter 37, and so on execute updating of the structure $U^k$ by the traditional Richardson-Lucy method. Alternatively, if the R-L high-speed algorithm in which the process speed by the Richardson-Lucy method is increased is employed, the structure $U^k$ can be updated to a true structure U more rapidly.

Figure 10:
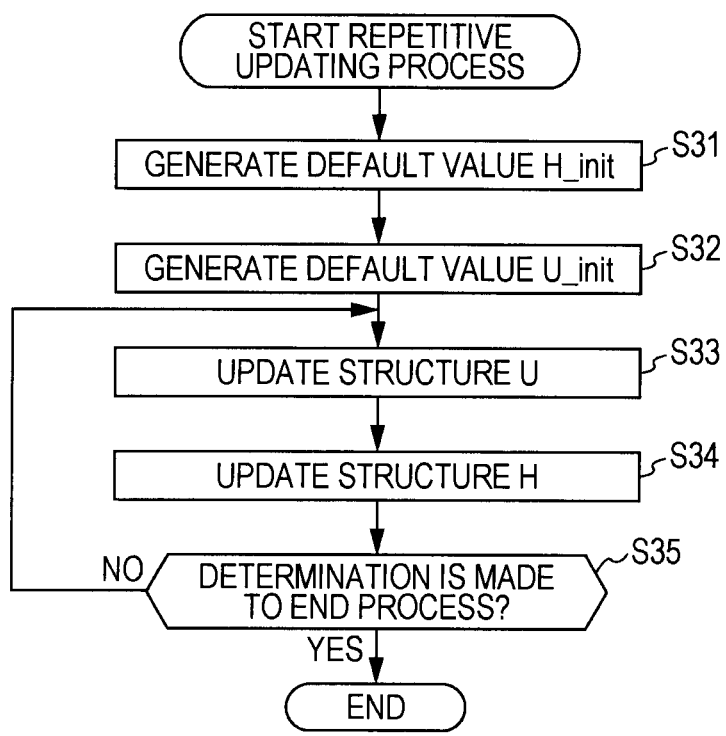
FIG. 10 is a flowchart describing a repetitive updating process.

Further, description has been made in which, with the repetitive updating process in FIG. 10, in step S35, determination is made whether to end the repetitive updating process according to whether or not the updated structure $U^k$ has converged, but the present invention is not restricted to this.

Specifically, for example, an arrangement may be made in which determination is made in step S35 whether or not the structure $U^k$ and the point spread function $H^k$ have been updated a predetermined number of times, and in the case that determination is made that updating has been made a predetermined number of times, the repetitive updating process is ended. Note that, as the predetermined number of times, for example, a number of times to some extent that ringing does not occur even with a low-precision PSF, or a number of times to some extent that ringing slightly generated by the total variation filter 37 can be canceled, is desirable.

[Application Method of Residual Deconvolution]

Incidentally, with the first embodiment of the present invention, the structure $U^k$ with the filter threshold being reduced sufficiently has been taken as the final output, but the method according to the traditional residual deconvolution may be executed using a blurry image and the updated structure $U^k$.

Figure 11:
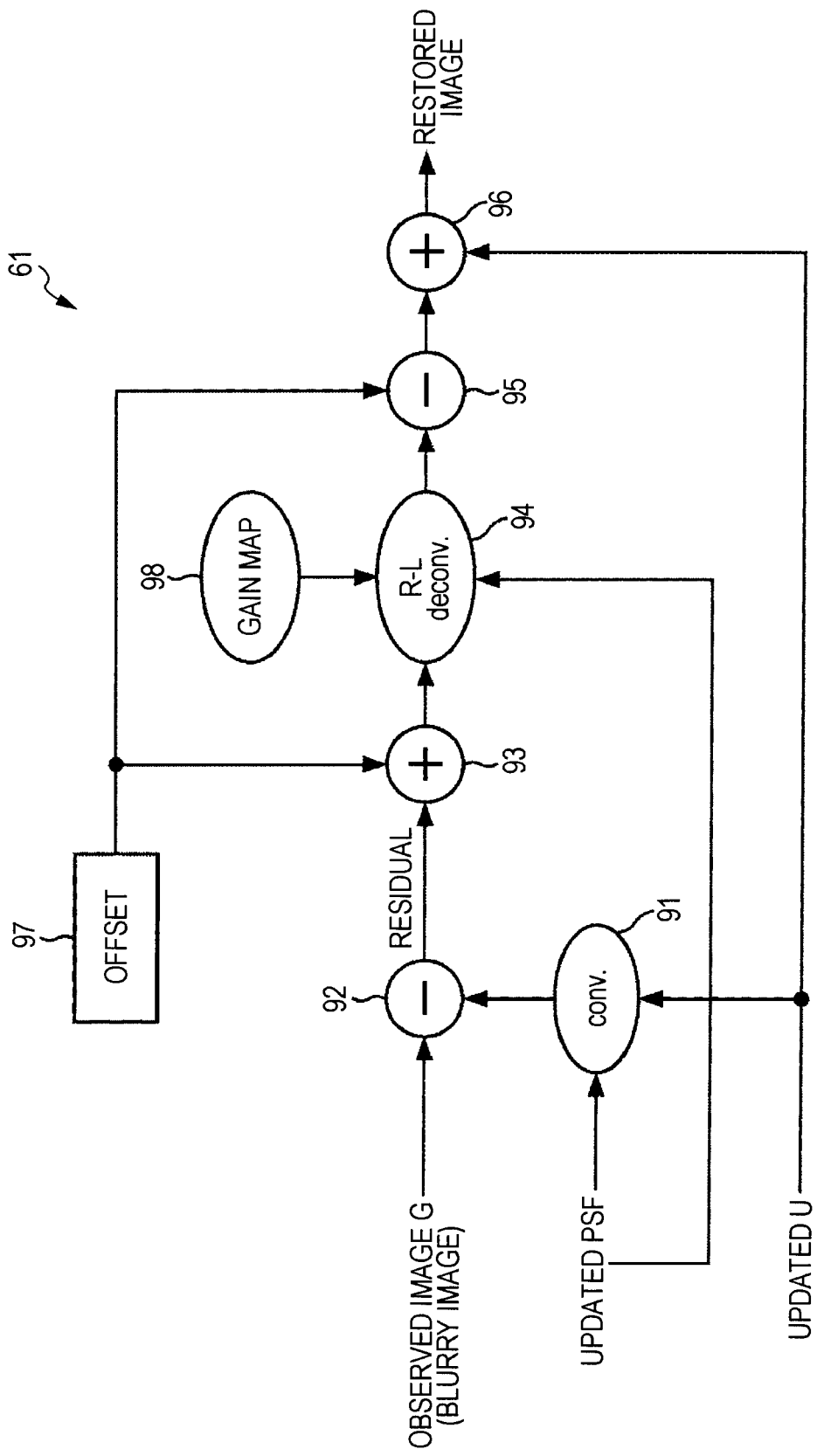
FIG. 11 is a block diagram illustrating a second configuration example of an information processing apparatus to which an embodiment of the present invention is applied.

FIG. 11 illustrates a configuration example of an information processing apparatus 61 configured to execute the method according the traditional residual deconvolution using a blurry image and the updated structure $U^k$.

This information processing apparatus 61 is configured of a cony unit 91, a subtracting unit 92, an adding unit 93, an R-Ldeconv unit 94, a subtracting unit 95, an adding unit 96, an offset unit 97, and a gain map (Gain Map) 98.

The updated $H^k$ and the updated $U^k$ are supplied to the cony unit 91. The cony unit 91 executes convolution calculation between the updated $H^k$ and the updated $U^k$, and then supplies a value $H^k O U^k$ obtained as a result thereof to the subtracting unit 92.

The blurry image G is supplied to the subtracting unit 92. The subtracting unit 92 subtracts the value $H^k O U^k$ from the cony unit 91 from the supplied blurry image G, and then supplies a subtraction result $G - H^k O U^k$ thereof to the adding unit 93 as a residual component.

In order to change the residual component $G - H^k O U^k$ from the subtracting unit 92 to a positive value, the adding unit 93 adds the offset value from the offset unit 97 to the residual component $G - H^k O U^k$, and then supplies an addition result thereof to the R-Ldeconv unit 94. Note that the reason to add the offset value to the residual component $G - H^k O U^k$ to change the residual component $G - H^k O U^k$ to a positive value is in that a positive value is handled at the process by the R-Ldeconv unit 94.

The R-Ldeconv unit 94 executes the residual deconvolution described in Image Deblurring with Blurred/Noisy Image Pairs (Lu Yuan) as to the addition result from the adding unit 93 based on the gain map held in the gain map (Gain Map) unit 98, and the updated $H^k$. Thus, the residual component of ringing to which the offset value has been added is suppressed.

The subtracting unit 95 subtracts the same offset value as the offset value added at the adding unit 93 from the processing result from the R-Ldeconv unit 94, and obtains a residual component from which the ringing has been suppressed, i.e., a restoration result in which the texture of the blurry image has been restored. Subsequently, the subtracting unit 95 supplies the restoration result of the obtained texture to the adding unit 96.

The updated structure $U^k$ is supplied to the adding unit 96. The adding unit 96 adds the texture restoration result from the subtracting unit 95, and the supplied updated structure $U^k$, and outputs a restored image obtained as a result thereof in which blurring has been removed from the blurry image.

In other words, for example, the adding unit 96 adds the texture restoration result and updated structure $U^k$, which correspond to a block making up the blurry image, and obtains a restored block in which the blurring has been removed, from a block making up the blurry image, as the addition result thereof. Subsequently, the adding unit 96 obtains the restored block corresponding to each of the blocks making up the blurry image, and connects each of the restored blocks, thereby outputting a restored image.

The offset unit 97 holds the offset value to be added to change the residual component $G - H^k O U^k$ to a positive value beforehand. The offset unit 97 supplies the offset value held beforehand to the adding unit 93 and the subtracting unit 95.

The gain map unit 98 holds the gain map to be used for adjusting the gain of the residual component $G - H^k O U^k$ beforehand.

As shown in FIG. 11, blurring is generated as to the updated structure $U^k$ by the updated point spread function PSF (point spread function $H^k$), deconvolution (process by the R-Ldeconv unit 94) is executed as to the residual component $G - H^k O U^k$ from the blurry image G, and adds an obtained result thereof (restoration result in which the texture of the blurry image has been restored) to the updated structure $U^k$, by which the detailed information of the residual is restored, and a fine restoration result is obtained.

[Application Method to Color Space Other than RGB Space]

Note that, with the first embodiment of the present invention, the repetitive updating process has been executed regarding RGB space (a blurry image made up of pixels represented with a R component, a G component, and a B component), but a similar repetitive updating process may be executed regarding other color space such as YUV space or the like.

Figure 12:
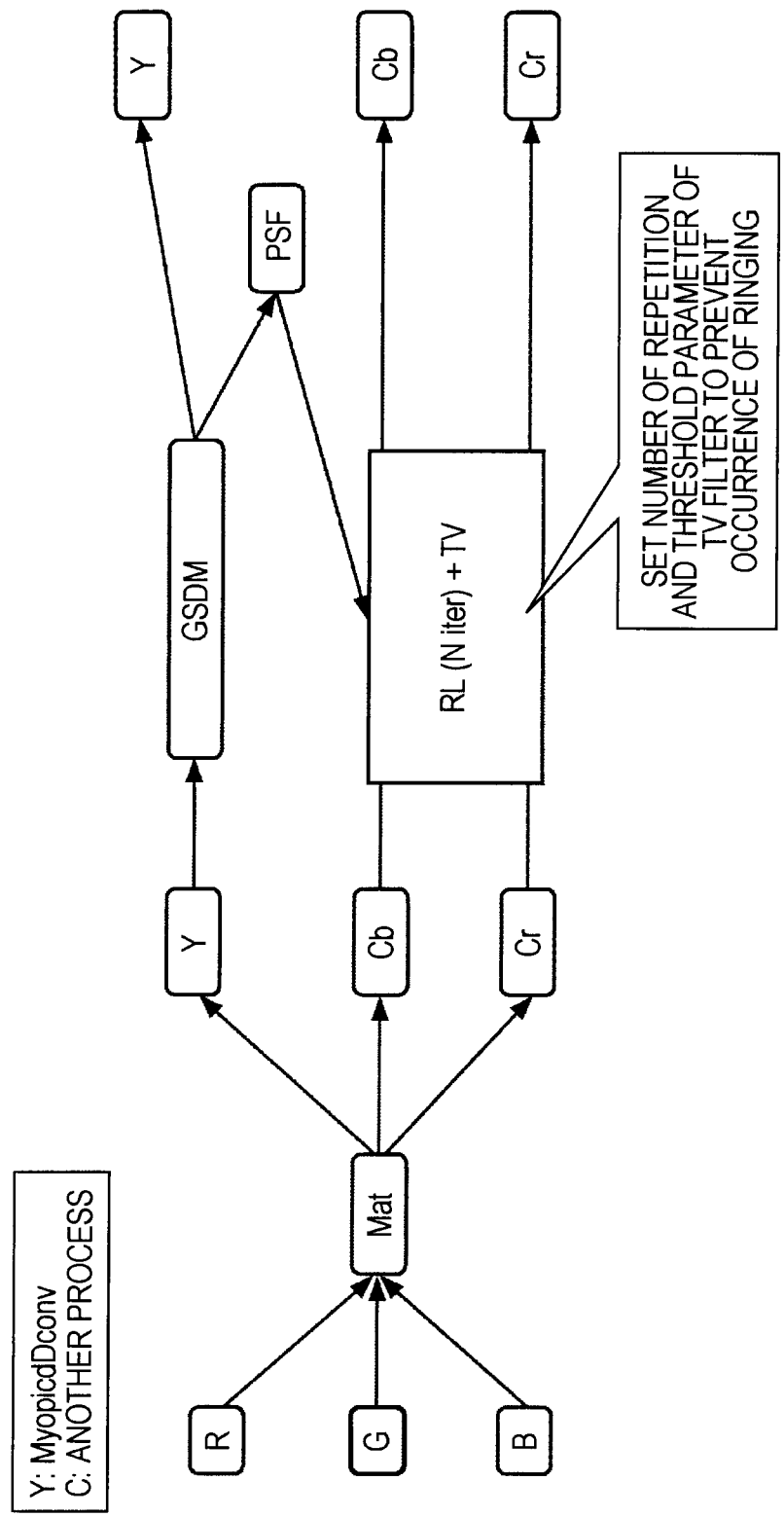
FIG. 12 is a diagram illustrating the repetitive updating process regarding YUV space.

FIG. 12 is a diagram illustrating that the repetitive updating process is executed regarding YUV space.

As shown in FIG. 12, an arrangement may be made in which, with YUV space, after the repetitive updating process (GSDM, Gradual Structure Deconvolution Method) is applied to Y alone to calculate an accurate PSF, a U/V component is subjected to a process by the Richardson-Lucy method or the like using the calculated accurate PSF to some extent that ringing does not occur, and adds this to Y.

Note that, with the above first embodiment, an arrangement has been made in which the point spread function $H^k$ is updated using the landweber method, and also the structure $U^k$ is updated using the Richardson-Lucy method. Alternatively, for example, an arrangement may be made in which the point spread function $H^k$ is updated using the Richardson-Lucy method, and also the structure $U^k$ is updated using the landweber method.

<3. Second Embodiment>

[Configuration of Information Processing Apparatus]

Figure 13:
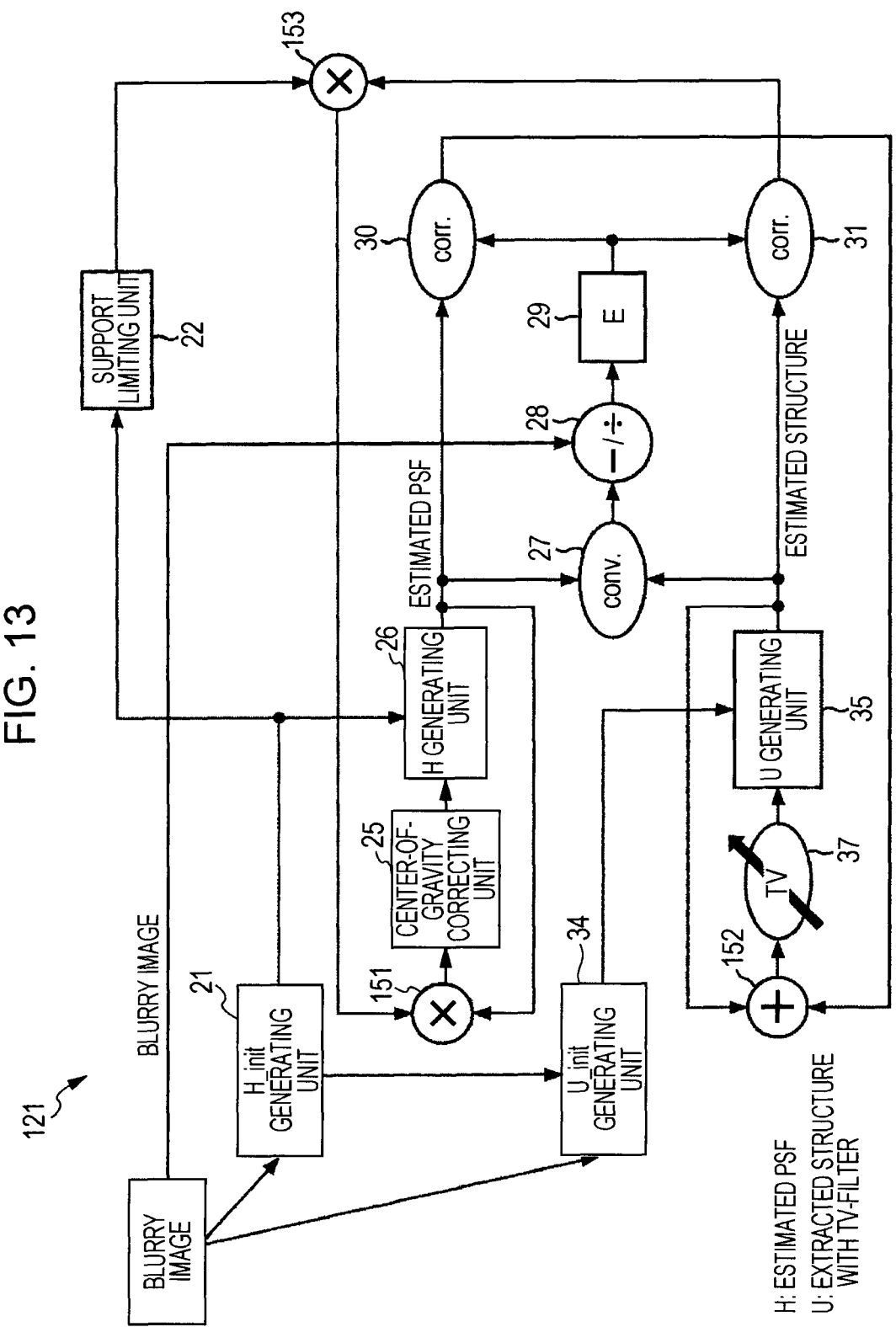
FIG. 13 is a block diagram illustrating a third configuration example of an information processing apparatus to which an embodiment of the present invention is applied.

Referring now to FIG. 13, description will be made regarding an information processing apparatus 121 which updates the point spread function $H^k$ using the Richardson-Lucy method, and also updates the structure $U^k$ using the landweber method.

FIG. 13 illustrates the information processing apparatus 121 serving as a second embodiment of the present invention.

Note that, with this information processing apparatus 121, of the components of the information processing apparatus 1 serving as the first embodiment shown in FIG. 1, the common components are denoted with the same reference numerals, and description thereof will be omitted as appropriate.

Specifically, the information processing apparatus 121 is configured in the same way as the information processing apparatus 1 in except that, with the information processing apparatus 121, a multiplying unit 151 instead of the adding unit 24, an adding unit 152 instead of the multiplying unit 36, and a multiplying unit 153 instead of the multiplying unit 23, averaging unit 32, and subtracting unit 33 are provided, respectively.

The calculation result $U^k \text{o} (G - H^k O U^k)$ corresponding to the region around the default estimated PSF is supplied from the multiplying unit 153 to the multiplying unit 151, and the point spread function $H^k$ is supplied from the H generating unit 26 to the multiplying unit 151, respectively.

The multiplying unit 151 multiplies the calculation result $U^k \text{o} (G - H^k O U^k)$ from the multiplying unit 153, and the point spread function $H^k$ from the H generating unit 26, and then supplies a point spread function $H = H^k U^k \text{o} (G - H^k O U^k)$ obtained as a result thereof to the center-of-gravity correcting unit 25.

The calculation result $H^k \text{o} (G - H^k O U^k)$ is supplied from the corr unit 30 to the adding unit 152, and the structure $U^k$ is supplied from the U generating unit 35 to the adding unit 152, respectively.

The adding unit 152 adds the structure $U^k$ from the U generating unit 35 to a value $\lambda H^k \text{o} (G - H^k O U^k)$ obtained by multiplying the calculation result $H^k \text{o} (G - H^k O U^k)$ from the corr unit 30 by the undetermined multiplier $\lambda$. Subsequently, the adding unit 152 calculates the undetermined multiplier X regarding the addition result $U^k + \lambda H^k \text{o} (G - H^k O U^k) (= U^k + 1)$ obtained as a result thereof by the Lagrange's method for undetermined multipliers.

The adding unit 152 substitutes a constant a calculated as the solution of the undetermined multiplier 2 for the addition result $U^k+\lambda H^k$o $(G-H^kOU^k)$, and then supplies a structure $U^{k+1}=U^k+\lambda H^k$o $(G-H^kOU^k)$ obtained as a result thereof to the total variation filter 37.

The calculation result $U^k$o $(G-H^kOU^k)$ is supplied from the corr unit 31 to the multiplying unit 153, and the support limiting information is supplied from the support limiting unit 22 to the multiplying unit 153, respectively.

The multiplying unit 153 extracts, of the calculation result $U^k$o $(G-H^kOU^k)$ from the corr unit 31, only the calculation result corresponding to the region around the default estimated PSF based on the support limiting information from the support limiting unit 22, and then supplies this to the adding unit 151.

With this information processing apparatus 121 as well, the same operation effects as with the information processing apparatus 1 serving as the first embodiment can be provided.

<4. Modified Example 2>

With the second embodiment, an arrangement has been made in which the point spread function $H^k$ is updated using the Richardson-Lucy method, and also the structure $U^k$ is updated using the landweber method. Alternatively, the point spread function $H^k$ and the structure $U^k$ may be updated using the Richardson-Lucy method, or the point spread function $H^k$ and the structure $U^k$ may be updated using the landweber method.

Note that, with the first and second embodiments, an arrangement has been made in which the repetitive updating process is executed as to multiple blocks making up a blurry image, but the repetitive updating process may be executed with a blurry image itself as one block.

[Margin Process]

Figure 14:
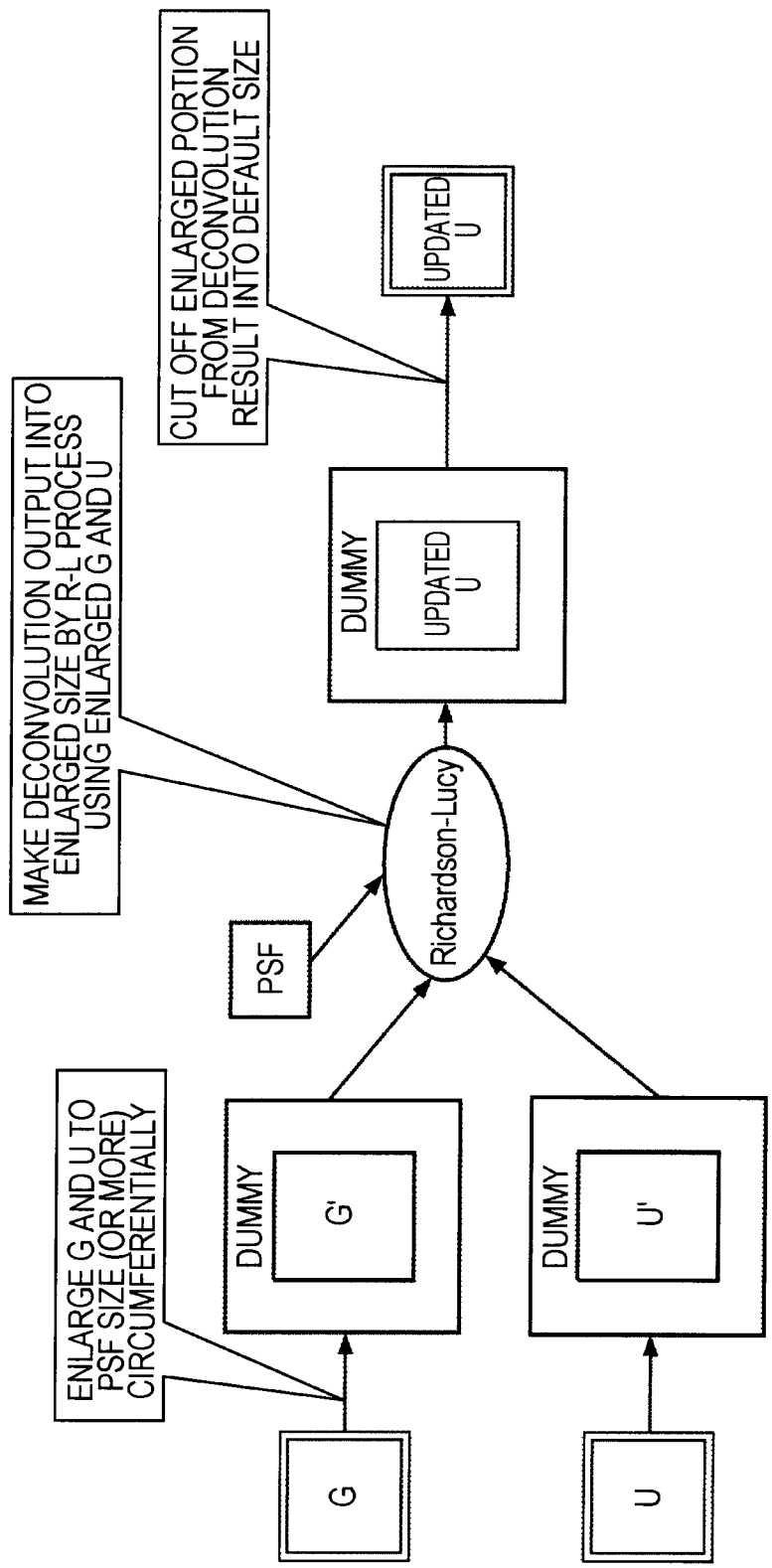
FIG. 14 is a first diagram illustrating a margin process.
Figure 15:
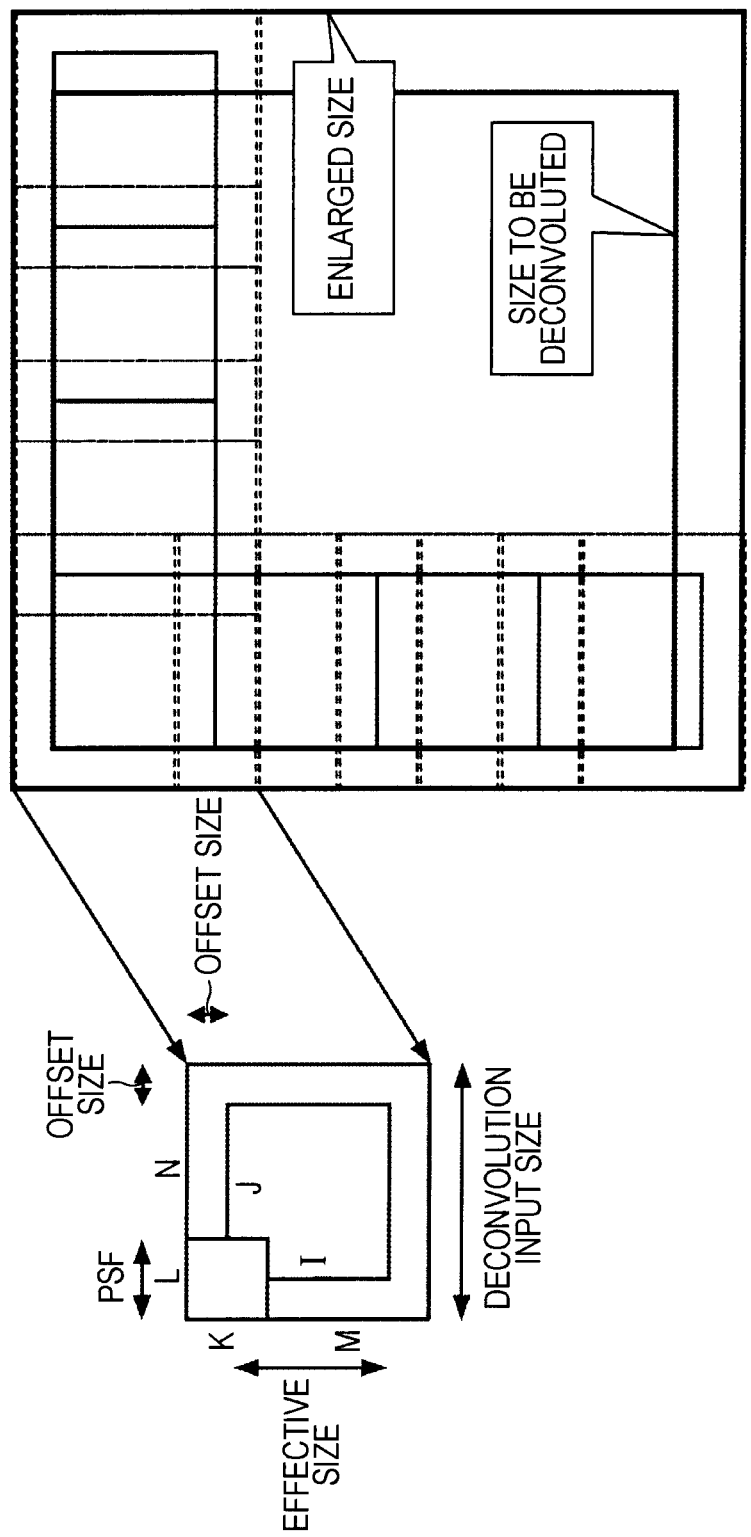
FIG. 15 is a second diagram illustrating the margin process.

Specifically, for example, a margin process may be executed in which a blurry image is divided into multiple blocks, the information processing apparatus 1 serving as the first embodiment or the information processing apparatus 121 serving as the second embodiment is used to execute the repetitive updating process for each block, and as shown in FIG. 14 and FIG. 15, the multiple blocks following the repetitive updating process are connected, thereby generating a restored image after restoration.

Referring now to FIG. 14, description will be made regarding a process to generate the structure $U^k$ corresponding to each of multiple blocks making up a blurry image.

As shown in FIG. 14, each of the multiple blocks making up the blurry image (e.g., G shown in FIG. 14) is enlarged (expanded) to maintain continuity between adjacent blocks such that the adjacent blocks have a size by which both are overlapped partially. Thus, an enlarged block (e.g., G' to which dummy is appended shown in FIG. 14) is generated.

Also, the structure $U^0$ corresponding to each of the blocks making up the blurry image (e.g., U shown in FIG. 14) is also enlarged with the same size. Thus, an enlarged structure (e.g., U' to which dummy is appended shown in FIG. 14) is generated.

Subsequently, updating of an enlarged structure is executed by the Richardson-Lucy method based on the enlarged blocks, enlarged structures, and the point spread function $H^0$ generated based on the enlarged blocks (e.g., PSF shown in FIG. 14).

The enlarged structure after updating obtained by updating of an enlarged structure by the Richardson-Lucy method (e.g., updated U to which dummy has been appended, shown in FIG. 14) is reduced to the size of the original structure $U^0$. Thus, as a structure corresponding to each of the multiple blocks making up the blurry image, a structure in which continuity between adjacent blocks is maintained (e.g., updated U shown in FIG. 14) is obtained, and as shown in FIG. 15, the obtained structures are connected, by which a restored image of which the blurring has been reduced (removed) can be obtained.

Here, referring now to FIG. 16 to FIG. 24, an example of the margin process will be described in detail.

Hereinafter, a blurry image to be served as a target of restoration is also referred to as an original image. In the following description, furthermore, a region to be added to each block to generate an enlarged block is referred to as a dummy region.

Figure 16:
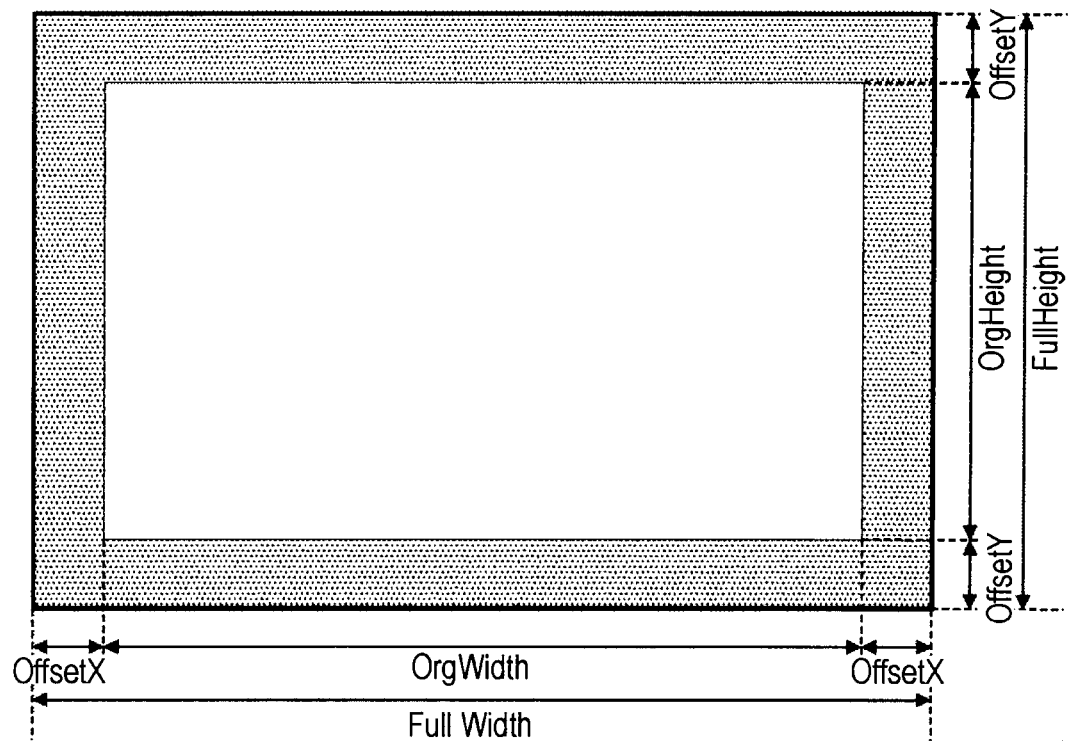
FIG. 16 is a diagram illustrating the definition of the size of each of an original image and an enlarged image.

In the following description, the width of an original image represented by a white region in FIG. 16 is referred to as "OrgWidth" and the height thereof is referred to as "OrgHeight". In the following description, furthermore, the width of the dummy region represented by a gray region in FIG. 16 is referred to as "OffsetX" and the height thereof is referred to as "OffsetY". Note that an exemplary method for defining the width (OffsetX) and height (OffsetY) of the dummy region will be described latter.

Furthermore, in the following description, an image obtained by adding the dummy region to the original image is referred to as an enlarged image. The width of the enlarged image is referred to as FullWidth and the height thereof is referred to as FullHeight. Furthermore, in the following description, the number of divided portions of the enlarged image in the lateral direction is referred to as "DivNum" just as in the case with the vertical direction thereof. In other words, the enlarged block can be divided into the enlarged blocks (DivNum in the vertical direction×DivNum in the horizontal direction).

Hereinafter, furthermore, in the coordinate system of the enlarged image, a pixel located on the upper left corner is defined as the origin (0, 0) and the horizontal direction of the enlarged direction is defined as the x axial direction and the vertical direction of the enlarged direction is defined as the y axial direction. In addition, the rightward direction is defined as the positive x axial direction and the downward direction is defined as the positive y axial direction.

Hereinafter, the processor of the information processing apparatus 1 or the information processing apparatus 121, which carries out the repetitive updating process, is designed to execute SIMB (Single Instruction Multiple Data) and process 16-byte data at the maximum per command during execution of the SIMD. Here, in the following description, the amount of data per pixel of each image is four bytes.

Figure 17:
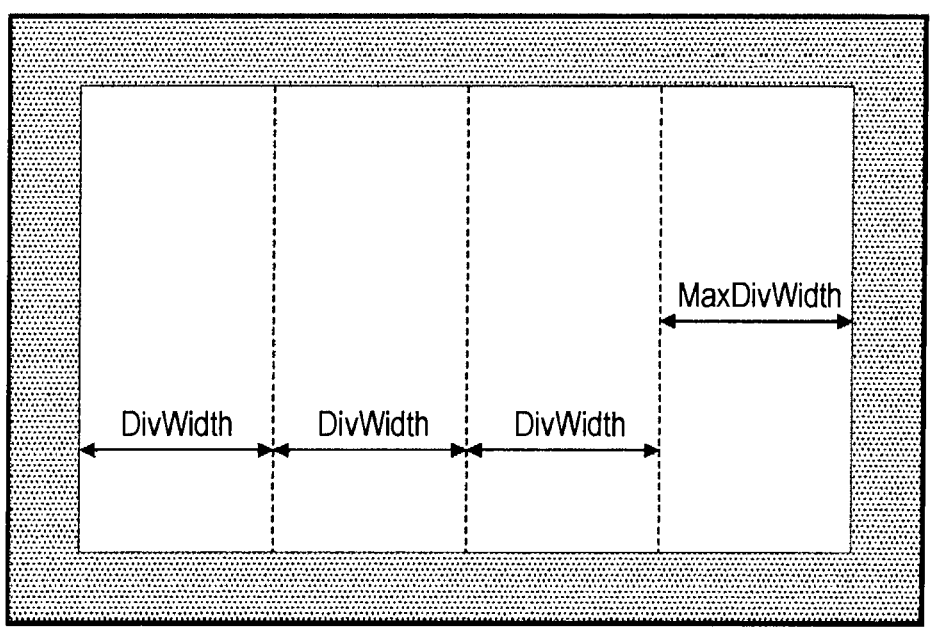
FIG. 17 is a diagram illustrating a method for defining the width of the enlarged block.

Referring first to FIG. 17, a method of defining the width (ROIWindth) of the extended block will be described.

First, in the following equation (5), the original image is simply divided into blocks (hereinafter, referred to as original blocks) by the number of divisions, DivNum, to obtain the width of each block, DivWidth.

$$\text{DivWidth} = \text{OrgWidth}/\text{DivNum} \qquad (5)$$

In this equation (5), the value of the width DivWidth is one obtained by rounding after the decimal point. Therefore, for example, if the original image is divided from the left side by the width DivWtdth as shown in FIG. 17, the width of the original block located on the most right side is larger than the width of any of other original blocks as long as the width of the original image, OrgWidth, is not divided by the number of divisions, DivNum. The width of the original block on the most right side, MaxDivWidth, can be obtained from the following equation (6):

$$\text{MaxDivWidth} = \text{OrgWidth} - (\text{DivWidth} \times (\text{DivNum}-1)) \qquad (6)$$

Subsequently, the width of the enlarged block, ROIWindth, can be obtained from the following equation (7):

$$ROIWidth = MaxDivWidth + 2 \times OffsetX + MaxAlign \quad (7)$$

In the equation (7), the term "MaxAlign" refers to the maximum amount of alignment when memory alignment of pixel data on the left end (left side) of each enlarged block is carried out so as to correspond to the data-processing unit of the processor of the information processing apparatus 1 or the information processing apparatus 121 when the data of the respective pixels in the enlarged image are arranged in the memory in the order of rasters.

Here, for example, the case where the number of divisions, DivNum, is equal to four (DivNum=4) will be considered.

As described above, the processor of the information processing apparatus 1 or the information processing apparatus 121 carries out the SIMD with 16 byte unit. In addition, each pixel of the enlarged image has a data amount of four bytes. Therefore, if the memory alignment is carried out so that the storage address of the data of the pixel located on the upper left corner of the enlarged image can be a multiple of 16, the x coordinate of the pixel on the left side of each enlarged block may be set to a multiple of 4 to carry out the memory alignment of the data of the pixel on the left side of each enlarged block.

For example, if the amounts of alignment of the second to fourth enlarged blocks from the left side are referred to as A2 to A4, the alignment amounts A2 to A4 can be obtained by the following equations (8) to (10):

$$A2 = \{(OffsetX + DivWidth \times 1) - OffsetX\} \ \& \ 0x03 \quad (8)$$

$$A3 = \{(OffsetX + DivWidth \times 2) - OffsetX\} \ \& \ 0x03 \quad (9)$$

$$A4 = \{(OffsetX + DivWidth \times 3) - OffsetX\} \ \& \ 0x03 \quad (10)$$

Then, MaxAlign can be obtained from the following equation (11):

$$MaxAlign = max(A2, A3, A4) \quad (11)$$

Figure 18:
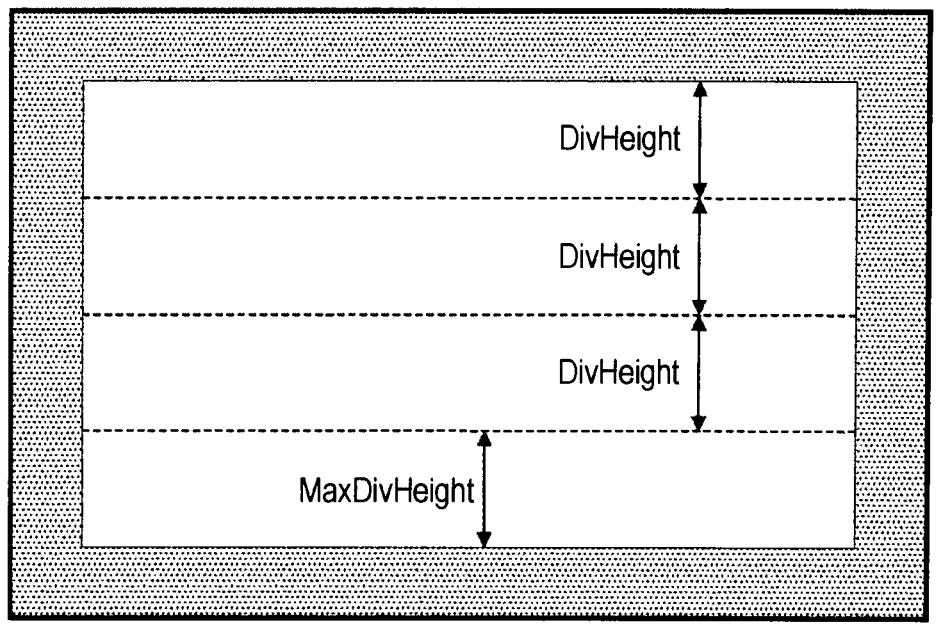
FIG. 18 is a diagram illustrating a method for defining the width of the enlarged block.

Referring now to FIG. 18, a method for defining the height of the enlarged block, ROIHeight, will be described.

First, when the original image is simply divided by the number of divisions, DivNum, the height of the original block, DivHeight, can be obtained from the following equation (12):

$$DivHeight = OrgWidth/DivNum \quad (12)$$

In this equation (12), the value of the width DivWidth is one obtained by rounding after the decimal point. Therefore, for example, if the original image is divided from the upper side by the height DivHeight as shown in FIG. 18, the height of the original block located on the most upper side is larger than the height of any of other original blocks as long as the height of the original image, OrgHeight, is not divided by the number of divisions, DivNum. The height of the original block on the lower side, MaxDivHeight, can be obtained from the following equation (13):

$$MaxDivHeight = OrgHeight - (DivHeight \times (DivNum - 1)) \quad (13)$$

Subsequently, the height of the enlarged block, ROIHeight, can be obtained from the following equation (14):

$$ROIHeight = MaxDivHeight + 2 \times OffsetY \quad (14)$$

Thus, the width of the enlarged block, ROIWidth, is equal to the width of the enlarged block on the right side when the alignment amount of the enlarged block on the right side, where the width thereof is MaxDivWidth, reaches to the maximum. In other words, the width of each enlarged block, ROIWidth, is set to the maximum width of the possible enlarged block. Similarly, the height of each enlarged block, ROIHeight, is set to the maximum height of the possible enlarged block. Therefore, the sizes of the respective enlarged blocks are equated one another, so that increases in efficiency and speed of the process can be realized.

If there is no desire for particular consideration of efficiency and speed of the process, the sizes of the respective enlarged blocks may be defined depending on a difference between DivWindth and MaxDivWidth, a difference between DivHeight and MaxDivHeight, and a difference between the alignment amounts.

Figure 19:
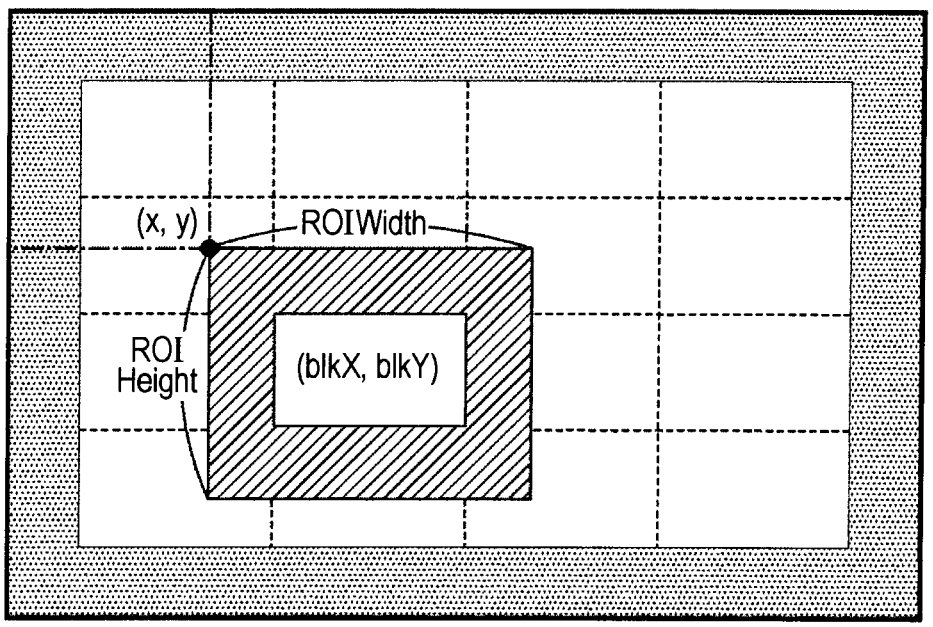
FIG. 19 is a diagram illustrating a method for defining the position of the enlarged block.

Referring now to FIG. 19, a method for setting the position of each enlarged block will be described. In the following description, the coordinates of the block unit of the enlarged block is represented by (blkX, blkY), and the coordinate of the enlarged block on the left upper corner is set to (blkX, blkY)=(0, 0).

The coordinate (x, y) of the pixel on the left upper corner of each enlarged block can be obtained from the following equations (15) and (16):

$$x = (DivWidth \times blkX) \ \&\ ^\sim 0x03 \quad (15)$$

$$y = DivHeight \times blkY \quad (16)$$

Here, ˜0x03 is 11111100 in binary form. Therefore, the x coordinates of the pixels on the left upper corners of the respective enlarged blocks are fundamentally defined at intervals corresponding to the width DivWidth. However, if the x coordinate value is not a multiple of four, the memory alignment is carried out to adjust the x coordinate value to a multiple of four. Furthermore, the y coordinates of the pixels on the left upper corners of the respective enlarged blocks are defined at intervals corresponding to the height DivHeight.

Here, in this example, it is premised that the data of the respective pixels of the image are arranged in the order of rasters. Therefore, in this example, the memory alignment carried out so that the x-axial coordinate of the left side of each enlarged block has been described. Alternatively, the arrangement is not limited to such an example if the data of the respective pixels in the enlarged image are arranged in the memory in order but not of rasters. For instance, the memory alignment may be performed so that the x-axial coordinate or y-axial coordinate of another side of the enlarged block may be a multiple of four. However, the coordinate value for the memory alignment is not limited to a multiple of four. It may be changed depending on the data amount of each pixel (byte) in the enlarged image as well as the processing unit (byte) of SIMD of the processor of the information processing apparatus 1 or information processing apparatus 121.

As described above, the number of enlarged blocks each having a size of "ROIHeight in height"×"ROIWidth in width" is set to "DivNum in vertical direction"×"DivNum in horizontal direction". The repetitive updating process as described above is carried out for every enlarged block to generate a structure Uk (namely, enlarged structure) corresponding to each enlarged block. Then, the generated enlarged structures are connected to one another to generate a restored image.

Here, referring now to FIG. 20 to FIG. 24, a process for generating a restored image by connecting the respective enlarged structures to one another.

Figure 20:
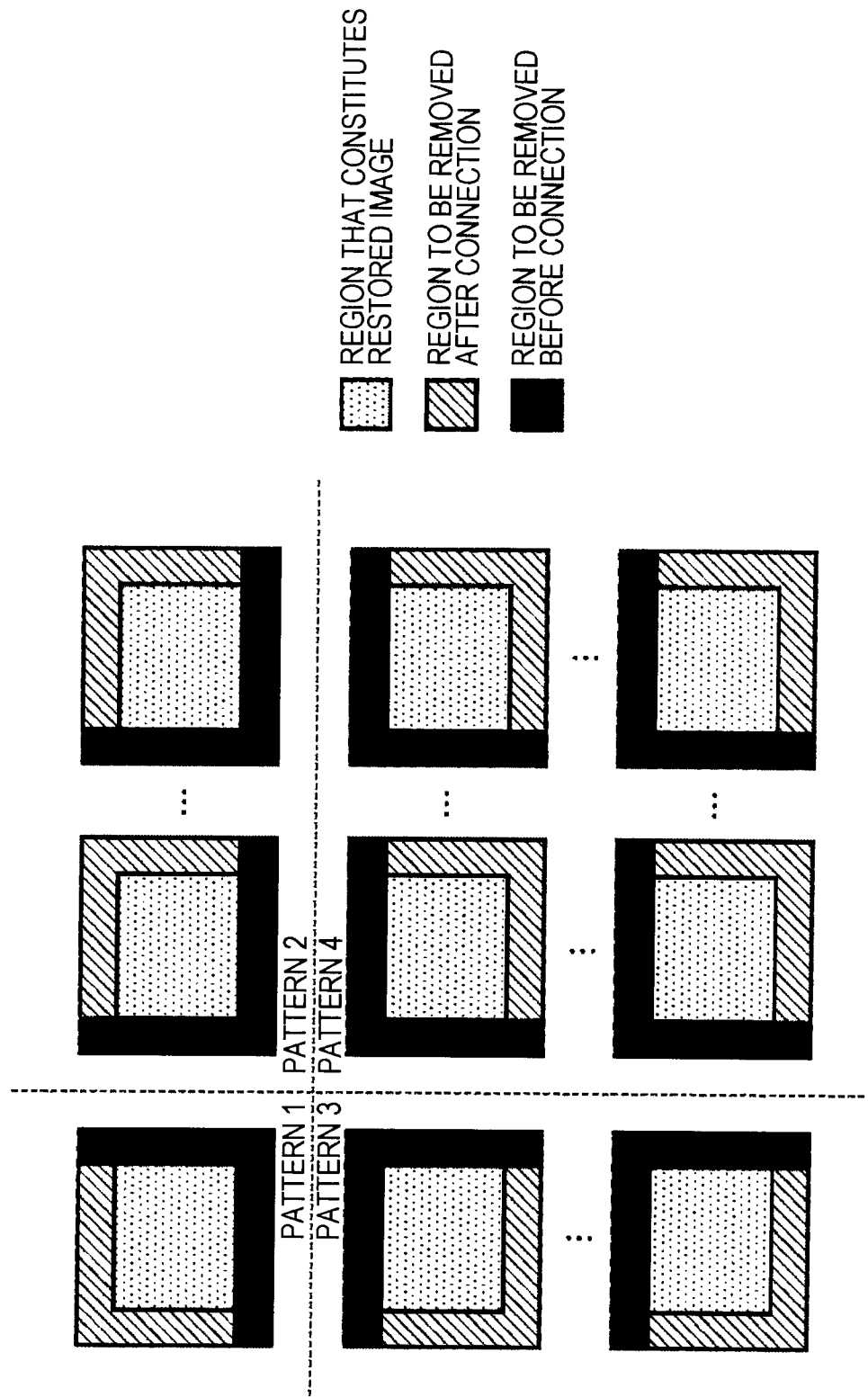
FIG. 20 is a first diagram illustrating a process for generating a restored image by connecting enlarged structures to one another.

As shown in FIG. 20, enlarged structures are classified into four different patterns 1 to 4 depending on their respective positions. Specifically, the enlarged structure corresponding to an enlarged block on the left upper corner of an enlarged image is classified into pattern 1. Also, the enlarged structure corresponding to any of enlarged blocks on the upper side of the enlarged image other than the enlarged block on the left upper corner can be classified into pattern 2. Furthermore, the enlarged structure corresponding to any of enlarged blocks on the left side of the enlarged image other than the enlarged block on the left upper corner can be classified into pattern 3. Furthermore, the enlarged structure other than those classified into patterns 1 to 3 is classified into pattern 4.

Figure 21:
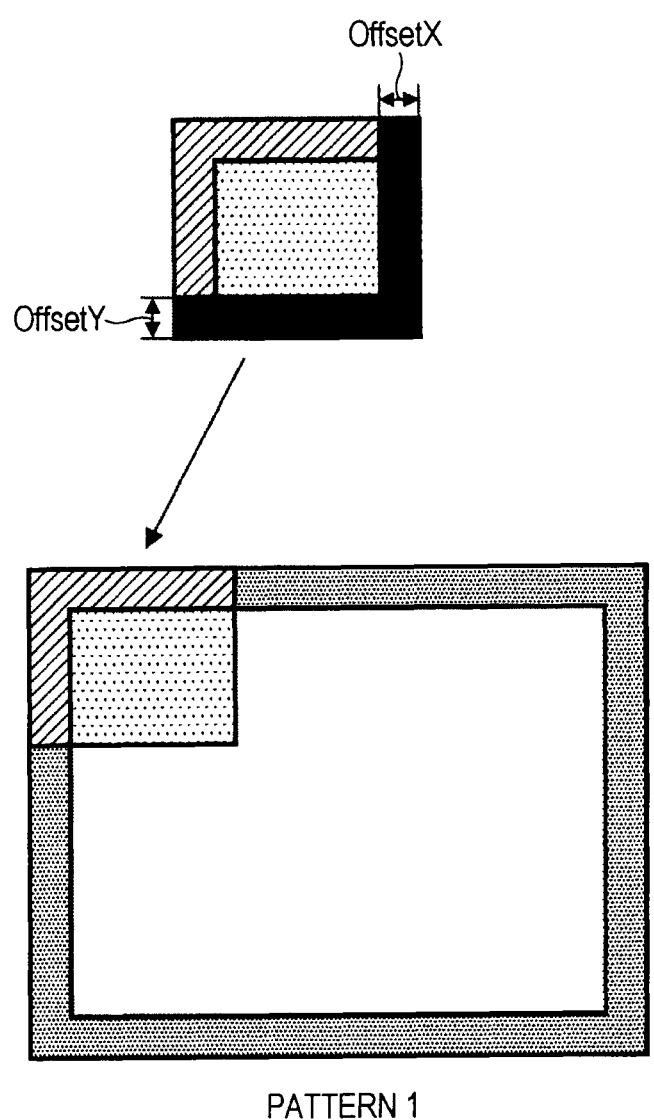
FIG. 21 a second diagram illustrating the process for generating the restored image by connecting the enlarged structures to one another.

As shown in FIG. 21, a black-colored region extending from the right side to the width OffsetX and from the lower side to the height Offset Y is removed from the enlarged structure of pattern 1. Then, the remaining region is arranged so that the coordinate (x, y) of a pixel on the left upper corner can correspond to the coordinate (0, 0) in the coordinate system of the enlarged system.

Figure 22:
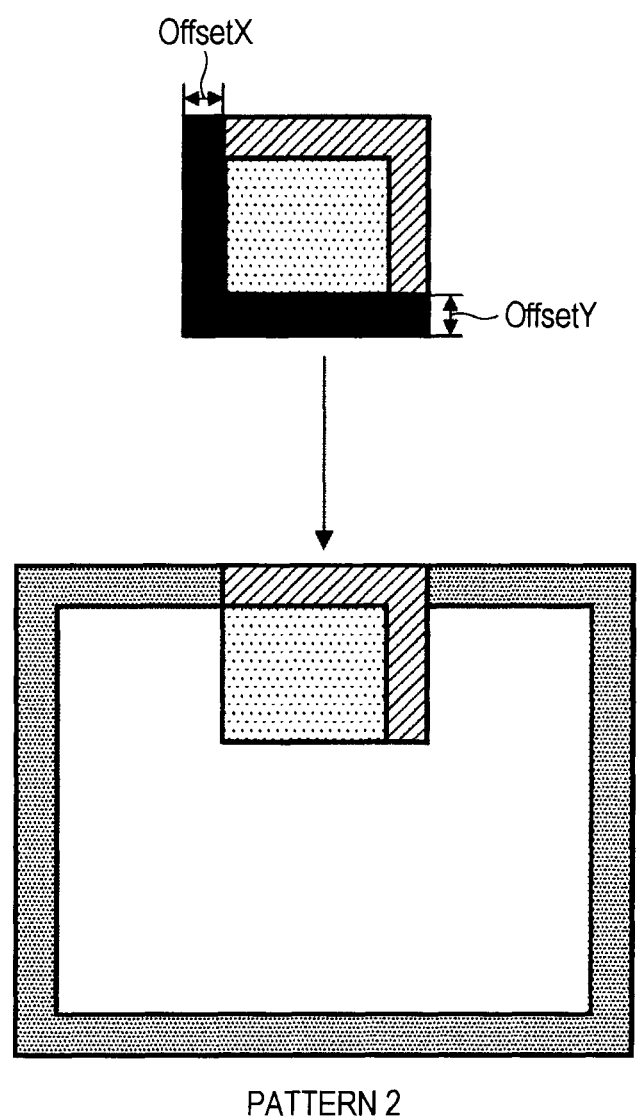
FIG. 22 is a third diagram illustrating the process for generating the restored image by connecting the enlarged structures to one another.

As shown in FIG. 22, a black-colored region extending from the left side to the width OffsetX and from the lower side to the height OffsetY is removed from the enlarged structure of pattern 2. Then, the remaining region is arranged so that the coordinate (x, y) of a pixel on the left upper corner can correspond to the coordinate calculated by the following equations (17) and (18):

$$x = (DivWidth \times blkX) \& \char`\~0x03 + offsetX \quad (17)$$

$$y = 0 \quad (18)$$

Figure 23:
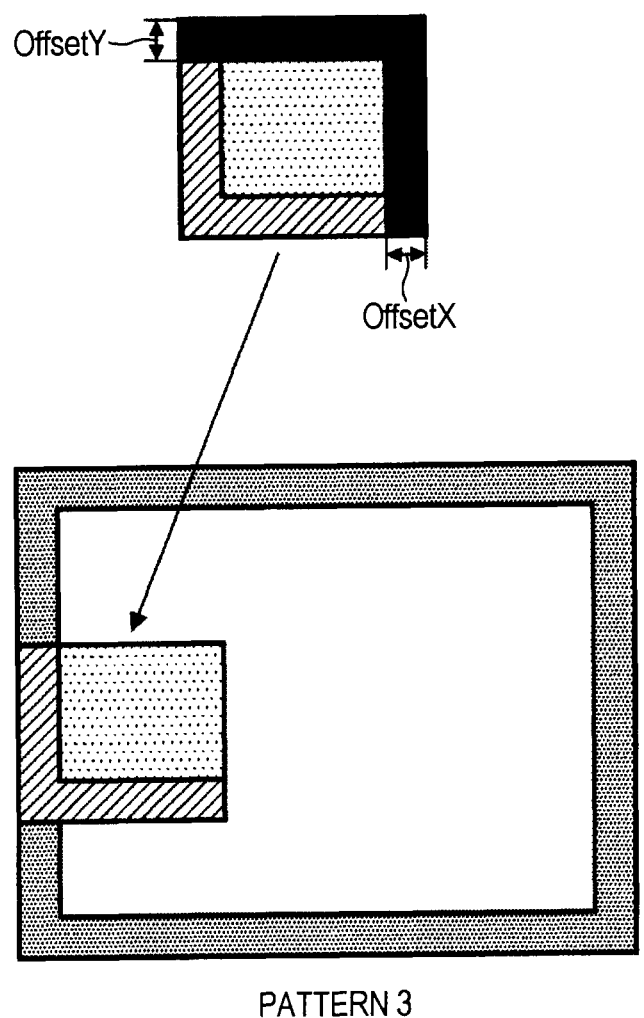
FIG. 23 is a fourth diagram illustrating the process for generating the restored image by connecting the enlarged structures to one another.

As shown in FIG. 23, a black-colored region extending from the right side to the width OffsetX and from the upper side to the height Offset Y is removed from the enlarged structure of pattern 3. Then, the remaining region is arranged so that the coordinate (x, y) of a pixel on the left upper corner can correspond to the coordinate calculated by the following equations (19) and (20):

$$x = 0 \quad (19)$$

$$y = DivHeight \times blkY + offsetY \quad (20)$$

Figure 24:
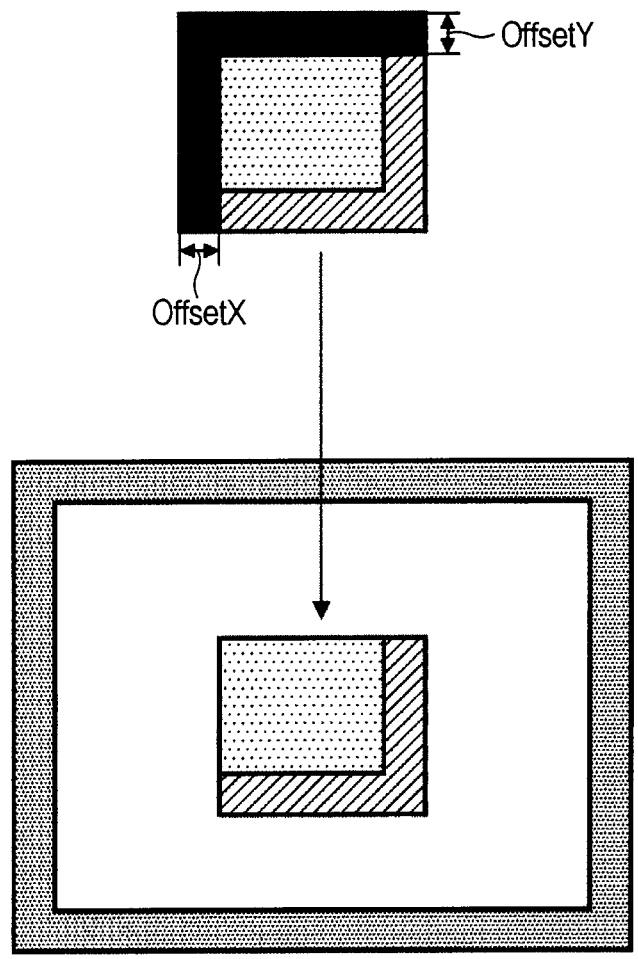
FIG. 24 is a fifth diagram illustrating the process for generating the restored image by connecting the enlarged structures to one another.

As shown in FIG. 24, a black-colored region extending from the left side to the width OffsetX and from the upper side to the height Offset Y is removed from the enlarged structure of pattern 4. Then, the remaining region is arranged so that the coordinate (x, y) of a pixel on the left upper corner can correspond to the coordinate calculated by the following equations (21) and (22):

$$x = (DivWidth \times blkX) \& \char`\~0x03 + offsetX \quad (21)$$

$$y = DivHeight \times blkY + offsetY \quad (22)$$

Therefore, when connecting the enlarged structures to one another, a region to be removed and a coordinate for arrangement are changed every pattern before the connection and the process is then carried out on the blocks of the same size. Accordingly, increases in efficiency and speed of the process can be realized.

subsequently, the region with a size of width offsetX and height offsetY around the image generated by arrangement of each of the extended structures is removed. As a result, a restored image can be obtained.

Therefore, continuity between blocks can be secured by execution of the margin process. Thus, a decrease in image quality due to the process after dividing into blocks can be prevented.

Furthermore, the repetitive updating process can be accelerated or the size of an intermediate buffer desired in the repetitive updating process can be decreased.

Figure 25:
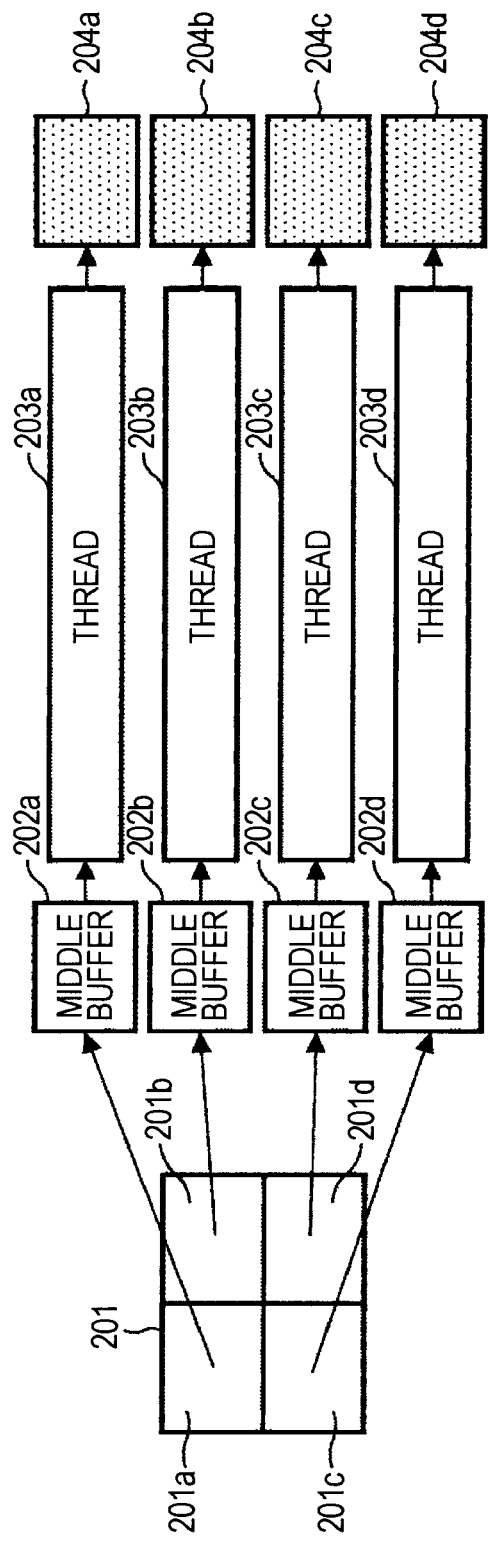
FIG. 25 is a first diagram illustrating the effect of a margin process.

For example, as shown in FIG. 25, the case where repetitive updating processes can be executed in parallel by four threads 203a to 203d will be considered.

In this case, for example, an enlarged image 201 is divided into four enlarged blocks 201a to 201d.

Subsequently, using four sets of intermediate buffers 202a to 202d and threads 203a to 203d, repetitive updating processes for the respective enlarged blocks are executed to generate enlarged structures 204a to 204d at high speed, respectively.

Figure 26:
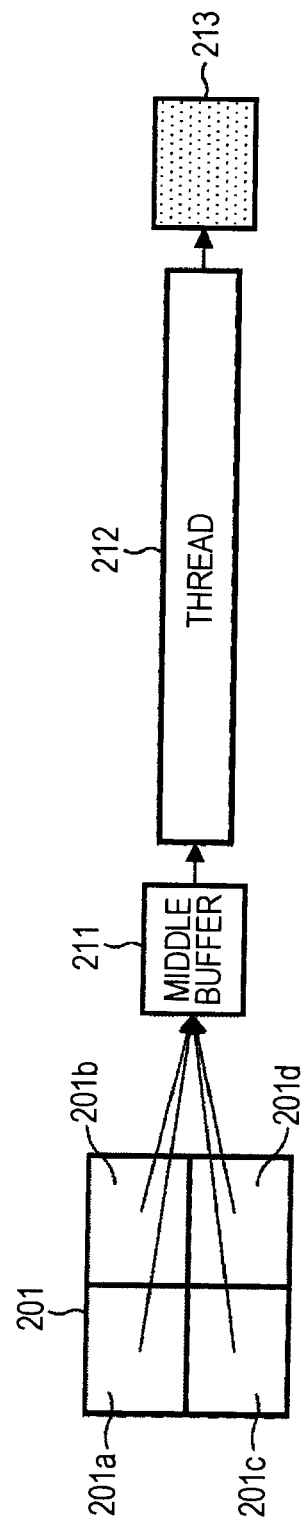
FIG. 26 is a second diagram illustrating the effect of the margin process.

Furthermore, as shown in FIG. 26, the case where only one thread 212 is subjected to the repetitive updating process is performed. In this case, for example, the enlarged image 201 is divided into enlarged blocks 201a to 201d. Using a set of the intermediate buffer 211 and the thread 212, the repetitive updating process is carried out on every enlarged structure 213. Therefore, the size of the desired intermediate buffer can be made small.

Note that an exemplary method for defining the width OffsetX, height OffsetY, and the number of divisions DivNum can be described.

For example, the width OffsetX and height OffsetY of the dummy region can be defined by allowing the H_init generating unit 21 to estimate PSF, based on the number Nt of taps of FFT (Fast Fourier Transform) to be used for generation of an initial value H_init of point spread function H, and the number of repetitive calculations Nr executed for separation of a structure component and a texture component by the total variation filter 37. More specifically, the width OffsetX and height OffsetY of the dummy region are set to the values equal to or over the total of the number Nt of taps of FFT and number of repetitive calculations Nr of the total variation filter 37.

If FFT is carried out on a data-free region or a discontinuous region, distortion may be caused by discontinuity of signals, resulting in noise in image processing. To prevent an image in an original block from an influence of noise due to the FET, the width OffsetX and height OffsetY of a dummy region are set to equal to or larger than the number of taps Nt of FFT.

Furthermore, the total variation filter 37 is designed to extend the range of an image to be served as a calculation target one pixel whenever it repeats calculation once. To prevent an image in an original block from an influence of a region from which noise is being generated due to the FET, the width OffsetX and height OffsetY of a dummy region are set to equal to or larger than the number of taps Nt of FFT plus the number of repetitive calculations Nr of the total variation filter 37.

As described above, the width OffsetX and height OffsetY of the dummy region to a value equal to or, larger than the total of the number of taps Nt of FFT and the number of repetitive calculations Nr of the total variation filter 37. Therefore, an influence of noise generated in the discontinuous region be prevented. Thus, a decrease in image quality due to the process after dividing into blocks can be prevented.

In addition, for example, the number of divisions DivNum is defined so that the data size of the enlarged block does not exceed an available memory size. In this case, furthermore, the number of divisions DivNum may be dynamically changed in proportion to a change in available memory size.

Furthermore, the number of divisions DivNum may be defined depending on the number of processors, such as CPUs, or the number of cores which can execute the repetitive updating processes of extended blocks in parallel. In this case, furthermore, if a change in usage rate of the processor occurs due to another process and a change in number of the processes which can execute the respective processes in parallel occurs, the number of divisions DivNum may be dynamically changed according to such a change.

Furthermore, for example, the number of divisions DivNum is defined so that a frame size obtained by subtracting the extended block from the original block to prevent the process speed from being extremely delayed.

Furthermore, in the above description, the example has been described so that the number of divisions DivNum in the vertical direction and the number of divisions DivNum in the horizontal direction are equal to each other. Alternatively, the number of divisions in the vertical direction may be different from one in the horizontal direction.

Alternatively, the point spread function $H^k$ may be updated and the finally obtained point spread function may be then used as a point spread function of another extended block to update the structure $U^k$ corresponding to another extended block.

In this case, in another extended block, the update of the point spread function $H^k$ is not desired. Only the structure $U^k$ may be updated. Therefore, in comparison with the update of the corresponding point spread function $H^k$ for every enlarged block, it is possible to reduce the size of a memory (the storage capacity thereof) to be used for calculating the point spread function of each extended block. Besides, it is also possible to reduce a computational effort for updating (calculating) the point spread function.

[Another Modified Example]

Also, with the first embodiment, an arrangement has been made in which the blurry image is divided into multiple blocks, the point spread function $H^k$ and the structure $U^k$ are updated repeatedly for each block. However, an arrangement may be made where updating of the point spread function $H^k$ is executed regarding a predetermined block alone of the multiple blocks, and the point spread function obtained finally is used as the point spread function for another block, by which memory used for calculating the point spread function $H^k$ of each block can be reduced, and also calculation amount used for updating (calculating) the point spread function can be reduced.

Incidentally, with the repetitive updating process, an arrangement has been made in which the process is executed on a blurry image, but in addition to this, this process may be executed as to a blurring image where defocusing due to focal length shift, in-plane uniform blurring, in-plane nonuniform surrounding blurring, or the like has occurred.

Also, with the repetitive updating process, the process may be executed as to a moving image recorded beforehand in which blurring has occurred, and also the process may be executed so as to detect blurring generated at the time of imaging a moving image to remove this in real time.

With the first embodiment in FIG. 1, an arrangement has been made in which, in order to separate the structure component and the texture component, and accordingly, the total variation filter 37 is used, but in addition to this, for example, a bilateral filter or an ε filter may be employed.

With the first and second embodiments, an arrangement has been made in which the processing unit 28 subtracts the calculation result $H^kOU^k$ from the cony unit 27 from the blurry image G, and then supplies the subtraction result thereof G−$H^kOU^k$ thereof to the residual generating unit 29.

Alternatively, the same results can be obtained even with an arrangement in which the blurry image G is divided by the calculation result $H^kOU^k$ from the cony unit 27, and the subtraction result $(H^kOU^k)/G$ thereof is supplied to the residual generating unit 29.

With the above repetitive updating process, an arrangement has been made in which in step S33, the point spread function $H^k$ is used to execute updating of the structure $U^k$, and simultaneous therewith, in step S34, the structure $U^k$ is used to execute updating of the point spread function $H^k$, but the present invention is not restricted to this.

In other words, for example, with the repetitive updating process, updating of the structure, and updating of the point spread may be executed alternately.

Specifically, for example, an arrangement may be made in which in step S33 the point spread function $H^k$ is used to execute updating of the structure $U^k$, and in step S34 the structure $U^{k+1}$ obtained by the updating thereof is used to execute updating of the point spread function $H^k$. Further, in the next step S33 the point spread function $H^{k+1}$ obtained by the updating is used to execute updating of the structure $U^{k+1}$, and in the next step S34 the structure $U^{k+2}$ obtained by the updating is used to execute updating of the point spread function $H^{k+1}$, by which updating of the structure and the point spread function can be executed alternately.

In this case, for example, as compared to the case of using the structure $U^k$ to execute the point spread function $H^k$, the structure $U^{k+1}$ approximated to a truer structure is used to execute the point spread function $H^k$, by which the point spread function $H^{k+1}$ approximated to a truer point of spread function can be obtained as the updating result of the point spread function $H^k$.

Also, the information processing apparatus 1 serving as the first embodiment, and the information processing apparatus 121 serving as the second embodiment may be applied to, for example, a recording/reproducing apparatus by which an image can be reproduced or recorded, or the like.

[Exemplary Configuration of Computer]

Incidentally, the above-mentioned series of processes can be executed by hardware, and can also be executed by software. In a case of executing the series of processing by software, a program making up the software thereof is installed from a program storage medium to a so-called built-in computer, or a general-purpose personal computer capable of executing various types of functions by various types of programs being installed, or the like.

Figure 27:
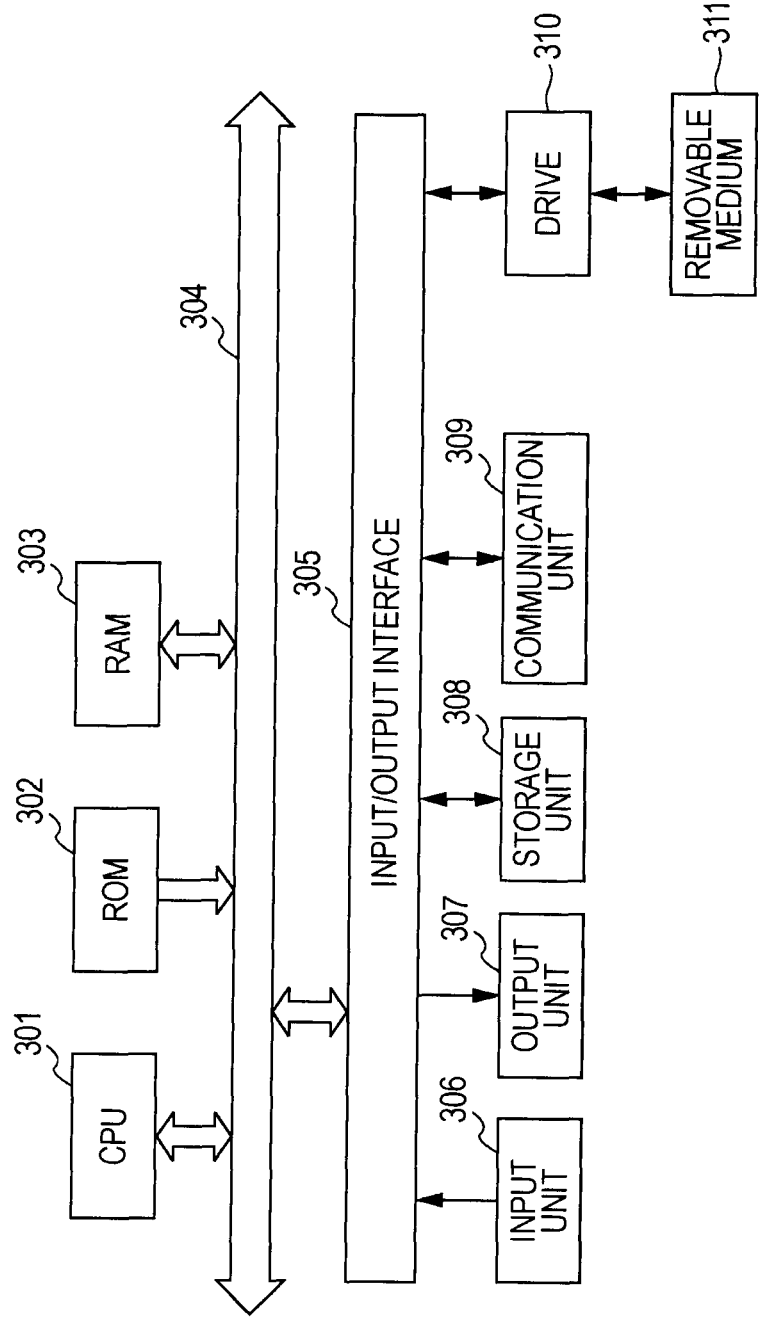
FIG. 27 is block diagram illustrating a configuration example of a computer.

FIG. 27 illustrates a configuration example of a computer which executes the above-mentioned series of processes by the program. A CPU (Central Processing Unit) 301 executes various types of processes in accordance with the program stored in ROM (Read Only Memory) 302 or a storage unit 308. A program that the CPU 303 executes, data, and so on are stored in RAM (Random Access Memory) 303 as appropriate. The CPU 301, ROM 302, and RAM 303 are connected mutually by a bus 304.

An input/output interface 305 is also connected to the CPU 301 via the bus 304. An input unit 306 made up of a keyboard, mouse, microphone, and so on, and an output unit 307 made up of a display, speaker, and so on, are connected to the input/output interface 305. The CPU 301 executes various types of process in accordance with a command input from the input unit 306. Subsequently, the CPU 301 outputs a process result to the output unit 307.

The storage unit 308 connected to the input/output interface 305 is made up of, for example, a hard disk, and stores a program that the CPU 301 executes, and various types of data.

A communication unit 309 communicates with an external apparatus via a network such as the Internet, a local area network, or the like.

Also, a program may be obtained via the communication unit 309 to store this in the storage unit 308.

When a removable medium 311, such as a magnetic disk, an optical disc, a magneto-optical disk, semiconductor memory, or the like, is mounted, a drive 310 connected to the input/output interface 305 drives this to obtain a program or data or the like recorded therein. The obtained program and data are transferred to the storage unit 308 and stored therein as appropriate.

A program storage medium which stores a program that is installed into a computer, and is turned into an executable state by the computer is, as shown in FIG. 27, configured of a removable medium 311 which is a package medium made up of a magnetic disk (including a flexible disk), optical disc (including CD-ROM (Compact Disc-Read Only Memory), DVD (Digital Versatile Disc)), magneto-optical disc (including MD (Mini-Disc)), semiconductor memory, or the like, or the ROM 302 in which a program is temporarily or eternally stored, and a hard disk making up the storage unit 308, and so on. Storing of a program in the program storage medium is executed via the communication unit 309 which is an interface as to a router or modem or the like, using a cable or wireless communication medium such as a local area network, the Internet, or digital satellite broadcasting, as appropriate.

Note that, in the present Specification, steps that describe a program to be stored in the program storage medium include not only processes performed in time sequence in accordance with the described sequence but also processes not necessarily performed in time sequence but performed in parallel or individually.

The present application contains subject matter related to that disclosed in Japanese Priority Patent Application JP 2009-288187 filed in the Japan Patent Office on Dec. 18, 2009, the entire content of which is hereby incorporated by reference.

Furthermore, the embodiments of the present invention are not limited to those described above. It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising:
   first generating means that generates a point spread function representing the degree of blurring generated in said input image;
   second generating means that generates a plurality of corrected block images obtained by correcting blurring of structure components of plural input block images based on said point spread function, where said plural input block images are images in plural second blocks obtained by enlarging the peripheries of plural first blocks obtained by dividing said input image; and
   updating means that executes one or more times an updating process to update said corrected block images using said point spread function to reduce a residual between a blurring-reproduced block image where blurring is generated in said corrected block image and said input block image corresponding to said blurring-reproduced block image, followed by making structure components of said updated corrected block images into new corrected block images,
   wherein said second generating means defines the size of said second block based on the number of repetitive calculations of a separation filter that separates a structure component and a text component of said corrected block image from each other.

2. The information processing apparatus according to claim 1, wherein
   said second generating means defines the size of said second block based on the number of taps of Fast Fourier Transform used for generating said point spread function.

3. The information processing apparatus according to claim 1, wherein
   said updating means further updates said point spread function to reduce a residual between said blurring-reproduced block image and said input block image.

4. The information processing apparatus according to claim 1, further comprising:
   third generating means that generates a corrected image where blurring of said input image is corrected by connecting said corrected block images after completing said update process.

5. An information processing apparatus comprising:
   first generating means that generates a point spread function representing the degree of blurring generated in said input image;
   second generating means that generates a plurality of corrected block images obtained by correcting blurring of structure components of plural input block images based on said point spread function, where said plural input block images are images in plural second blocks obtained by enlarging the peripheries of plural first blocks obtained by dividing said input image; and
   updating means that executes one or more times an updating process to update said corrected block images using said point spread function to reduce a residual between a blurring-reproduced block image where blurring is generated in said corrected block image and said input block image corresponding to said blurring-reproduced block image, followed by making structure components of said updated corrected block images into new corrected block images,
   wherein said second generating means defines the size and position of each of said second blocks so that the coordinate of a predetermined side of said second block in a predetermined direction corresponds to a multiple of a predetermined integer number.

6. An information processing method, comprising the step of allowing an information processing apparatus that corrects blurring generated in an image to perform a process including:
   generating a point spread function representing the degree of blurring generated in said input image;
   generating a plurality of corrected block images obtained by correcting blurring of structure components of plural input block images based on said point spread function, where said plural input block images are images in plural second blocks obtained by enlarging the peripheries of plural first blocks obtained by dividing said input image; and
   executing one or more times an updating process to update said corrected block images using said point spread function to reduce a residual between a blurring-reproduced block image where blurring is generated in said corrected block image and said input block image corresponding to said blurring-reproduced block image, followed by making structure components of said updated corrected block images into new corrected block images,
   wherein said generating a plurality of corrected block images comprises defining the size of said second block based on the number of repetitive calculations of a separation filter that separates a structure component and a text component of said corrected block image from each other.

7. A non-transitory, computer-readable medium storing instructions for instructing a computer to execute a process including:

generating a point spread function representing the degree of blurring generated in said input image;

generating a plurality of corrected block images obtained by correcting blurring of structure components of plural input block images based on said point spread function, where said plural input block images are images in plural second blocks obtained by enlarging the peripheries of plural first blocks obtained by dividing said input image; and executing one or more times an updating process to update said corrected block images using said point spread function to reduce a residual between a blurring-reproduced block image where blurring is generated in said corrected block image and said input block image corresponding to said blurring-reproduced block image, followed by making structure components of said updated corrected block images into new corrected block images, wherein generating a plurality of corrected block images comprises defining the size and position of each of said second blocks so that the coordinate of a predetermined side of said second block in a predetermined direction corresponds to a multiple of a predetermined integer number.

8. An information processing apparatus comprising:

a first generating unit that generates a point spread function representing the degree of blurring generated in said input image;

a second generating unit that generates a plurality of corrected block images obtained by correcting blurring of structure components of plural input block images based on said point spread function, where said plural input block images are images in plural second blocks obtained by enlarging the peripheries of plural first blocks obtained by dividing said input image; and an updating unit that executes one or more times an updating process to update said corrected block images using said point spread function to reduce a residual between a blurring-reproduced block image where blurring is generated in said corrected block image and said input block image corresponding to said blurring-reproduced block image, followed by making structure components of said updated corrected block images into new corrected block images, wherein the updating unit defines the size of said second block based on the number of repetitive calculations of a separation filter that separates a structure component and a text component of said corrected block image from each other.

* * * * *